(12) United States Patent
You et al.

(10) Patent No.: US 9,155,047 B2
(45) Date of Patent: Oct. 6, 2015

(54) MOBILE TERMINAL AND CONTROL METHOD THEREOF

(71) Applicant: LG ELECTRONICS INC., Seoul (KR)

(72) Inventors: Soolim You, Gwangmyeong (KR); Youngseok Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 226 days.

(21) Appl. No.: 13/747,082

(22) Filed: Jan. 22, 2013

(65) Prior Publication Data

US 2013/0310112 A1    Nov. 21, 2013

(30) Foreign Application Priority Data

May 21, 2012    (KR) ......................... 10-2012-0053830

(51) Int. Cl.
*H04W 52/02*    (2009.01)
(52) U.S. Cl.
CPC ................................ *H04W 52/0267* (2013.01)
(58) Field of Classification Search
CPC .... H02J 7/0004; H04B 5/0037; H04W 52/02; H04W 52/0267

USPC .................................. 455/573; 320/107, 108
See application file for complete search history.

(56) References Cited

U.S. PATENT DOCUMENTS

| | | | | |
|---|---|---|---|---|
| 7,787,405 | B2 * | 8/2010 | Dettinger et al. | 370/311 |
| 8,482,259 | B2 * | 7/2013 | Mueller | 320/136 |
| 2005/0206346 | A1 * | 9/2005 | Smith et al. | 320/132 |
| 2011/0115432 | A1 * | 5/2011 | El-Maleh et al. | 320/108 |
| 2014/0292269 | A1 * | 10/2014 | Keating et al. | 320/108 |

* cited by examiner

*Primary Examiner* — Raymond Dean
(74) *Attorney, Agent, or Firm* — Birch, Stewart, Kolasch & Birch, LLP

(57) ABSTRACT

A mobile terminal including a wireless communication unit configured to receive charging standby information for a plurality of wireless chargers, respectively; a display unit configured to display a plurality of display objects corresponding to the plurality of wireless chargers, respectively; and a controller configured to select at least one of the plurality of wireless chargers based on the received charging standby information, and distinctively display a display object corresponding to the selected wireless charger to distinguish the display object from the other objects.

16 Claims, 28 Drawing Sheets

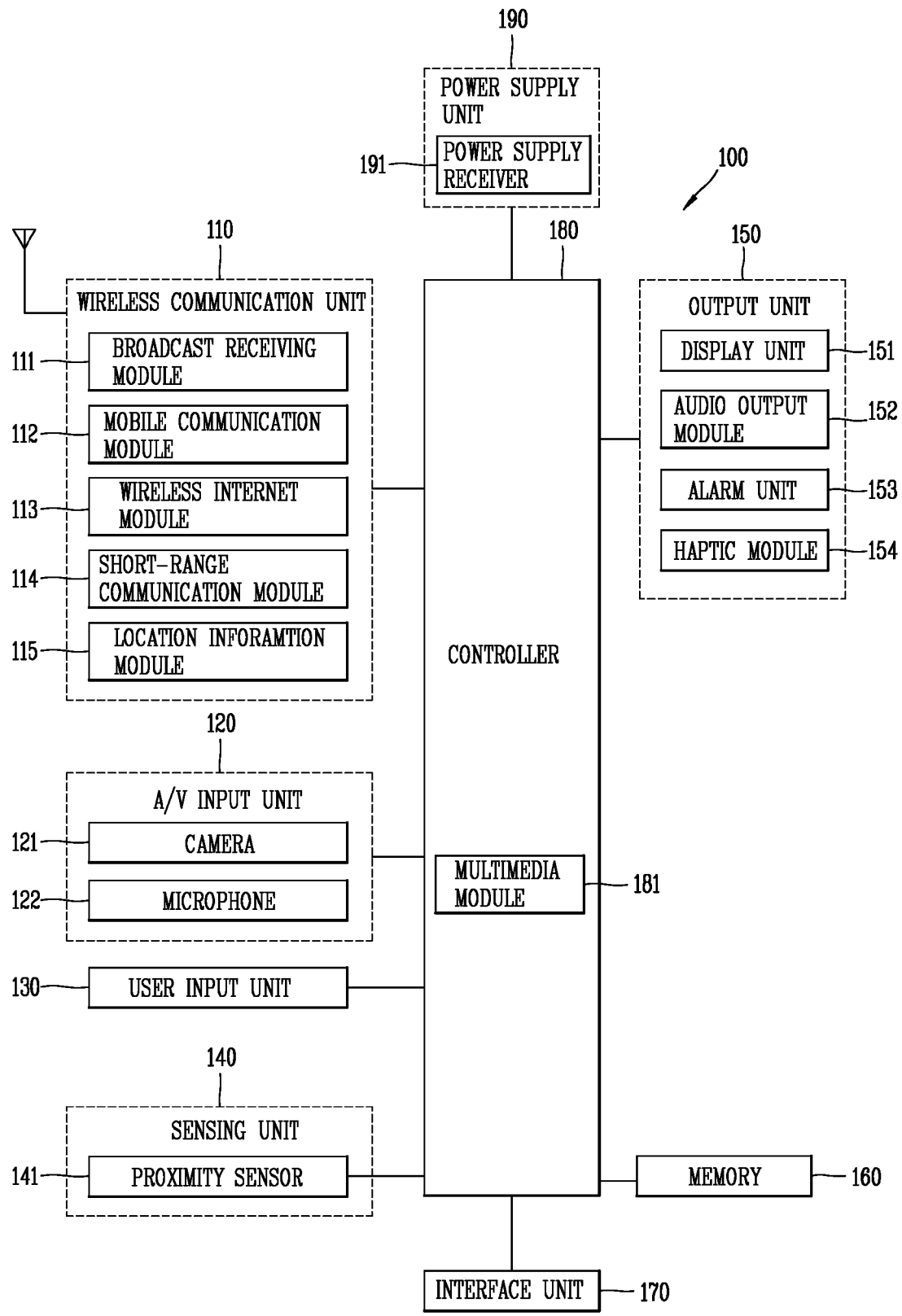

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Application No. 10-2012-0053830, filed on May 21, 2012, the contents of which is incorporated by reference herein in its entirety.

BACKGROUND OF THE INVENTION

1. Field of the Invention

The present invention relates to a mobile terminal, and more particularly, to a mobile terminal and corresponding method for wirelessly charging the mobile terminal.

2. Description of the Related Art

Terminals can be classified into mobile or portable terminals and a stationary terminals. Mobile terminals can be further classified into handheld terminals and vehicle mount terminals. Terminals are also multifunctional and can capture still images or moving images, play music or video files, play games, receive broadcast and the like. However, the battery consumption of the terminal has increased with the increase in available functions. The shorter battery life is inconvenient to the user.

SUMMARY OF THE INVENTION

Accordingly, one object of the present invention is to address the above-noted and other problems of the related art.

Another object of the present invention is to provide a mobile terminal and control method thereof capable of enhancing the user's convenience when wireless charging their mobile terminal.

To achieve these and other advantages and in accordance with the purpose of the present invention, as embodied and broadly described herein, the present invention provides in one aspect a mobile terminal, including a wireless communication unit configured to receive charging standby information for a plurality of wireless chargers, respectively; a display unit configured to display a plurality of display objects corresponding to the plurality of wireless chargers, respectively; and a controller configured to select at least one of the plurality of wireless chargers based on the received charging standby information, and distinctively display a display object corresponding to the selected wireless charger to distinguish the display object from the other objects.

In another aspect, the present invention provides a method of controlling a mobile terminal, and which includes receiving, via a wireless communication unit, charging standby information for a plurality of wireless chargers, respectively; displaying, via a display unit, a plurality of display objects corresponding to the plurality of wireless chargers, respectively; selecting, via a controller, at least one of the plurality of wireless chargers based on the received charging standby information; and distinctively displaying, via the display unit, a display object corresponding to the selected wireless charger to distinguish the display object from the other objects.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram illustrating a mobile terminal according to an embodiment of the present invention;

DETAILED DESCRIPTION OF THE INVENTION

Figure 2A:
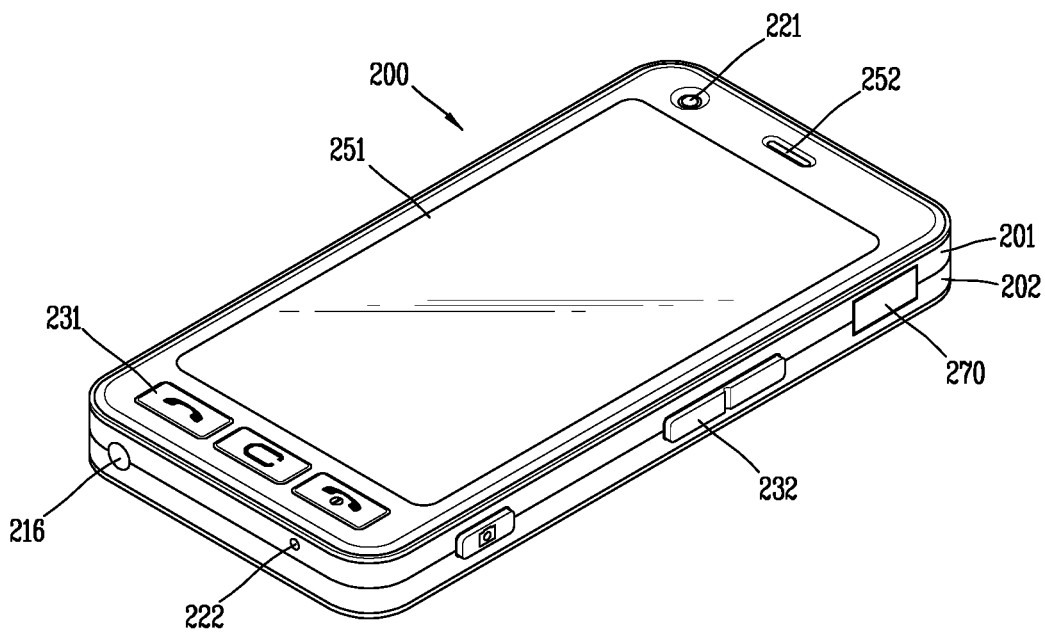
FIGS. 2A and 2B are perspective views illustrating an external appearance of the mobile terminal according to the present invention.

Reference will now be made in detail to the preferred embodiments of the present invention, examples of which are illustrated in the accompanying drawings.

FIG. 1 is a block diagram illustrating a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

The wireless communication unit 110 may include one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast associated information may mean information regarding a broadcast channel, a broadcast program, a broadcast service provider, and the like. The broadcast associated information may also be provided through a mobile communication network. In this case, the broadcast associated information may be received by the mobile communication module 112. The broadcast signal and broadcast-associated information received through the broadcast receiving module 111 may be stored in the memory 160.

The mobile communication module 112 transmits and/or receives a radio signal to and/or from at least one of a base station, an external terminal and a server over a mobile communication network. The radio signal may include a voice call signal, a video call signal or various types of data according to text and/or multimedia message transmission and reception.

The wireless Internet module 113 as a module for supporting wireless Internet access may be built-in or externally installed to the mobile terminal 100. A variety of wireless Internet access techniques may be used, such as WLAN (Wireless LAN), Wi-Fi, Wibro (Wireless Broadband), Wimax (World Interoperability for Microwave Access), HSDPA (High Speed Downlink Packet Access), and the like.

The short-range communication module 114 refers to a module for supporting a short-range communication. A variety of short-range communication technologies may be used, such as Bluetooth, Radio Frequency IDentification (RFID), Infrared Data Association (IrDA), Ultra WideBand (UWB), ZigBee, and the like. The location information module 115 is a module for acquiring a location of the mobile terminal 100, and there is a GPS module as a representative example.

Referring to FIG. 1, the A/V (audio/video) input unit 120 receives an audio or video signal, and the A/V (audio/video) input unit 120 may include a camera 121, a microphone 122, and the like. The camera 121 processes an image frame, such as still or moving images, obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and output into a format that is transmittable to a mobile communication base station through the mobile communication module 112 in the phone call mode. The microphone 122 may implement various types of noise canceling algorithms to cancel noise generated during the process of receiving the external audio signal.

The user input unit 130 may generate input data to control an operation of the mobile terminal 100. The user input unit 130 may be configured with a keypad, a dome switch, a touch pad (pressure/capacitance), a jog wheel, a jog switch, and the like.

The sensing unit 140 detects presence or absence of the user's contact, and a current status of the mobile terminal 100 such as an opened or closed configuration, a location of the mobile terminal 100, an orientation of the mobile terminal 100, an acceleration or deceleration of the mobile terminal 100, and the like, and generates a sensing signal for controlling the operation of the mobile terminal 100. For example, when the mobile terminal 100 is a slide phone type, the sensing unit 140 may sense an opened or closed configuration of the slide phone. Furthermore, the sensing unit 140 may sense whether or not power is supplied from the power supply unit 190, or whether or not an external device is coupled to the interface unit 170.

The sensing unit 140 may include a proximity sensor 141. Furthermore, the sensing unit 140 may include a touch sensor (not shown) for sensing a touch operation with respect to the display unit 151.

The touch sensor may be implemented as a touch film, a touch sheet, a touch pad, and the like. The touch sensor may be configured to convert changes of a pressure applied to a specific part of the display unit 151, or a capacitance generated from a specific part of the display unit 151, into electric input signals. The touch sensor may be configured to sense not only a touched position and a touched area, but also a touch pressure.

When the touch sensor and display unit 151 forms an interlayer structure, the display unit 151 may be used as an input device rather than an output device. The display unit 151 may be referred to as a "touch screen".

When there is a touch input through the touch screen, the corresponding signals may be transmitted to a touch controller (not shown). The touch controller processes signals transferred from the touch sensor, and then transmits data corresponding to the processed signals to the controller 180. Accordingly, the controller 180 may sense which region of the display unit 151 has been touched.

When the touch screen is a capacitance type, the proximity of a sensing object may be detected by changes of an electromagnetic field according to the proximity of a sensing object. The touch screen may be categorized into a proximity sensor 141.

The proximity sensor 141 refers to a sensor for detecting the presence or absence of a sensing object using an electromagnetic field or infrared rays without a mechanical contact. The proximity sensor 141 has a longer lifespan and more enhanced utility than a contact sensor. The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like.

Hereinafter, for the sake of convenience of brief explanation, a behavior of closely approaching the touch screen without contact will be referred to as "proximity touch", whereas a behavior that the pointer substantially comes in contact with the touch screen will be referred to as "contact touch".

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The output unit 150 may generate an output related to visual, auditory, tactile senses. The output unit 150 may include a display unit 151, an audio output module 152, an alarm unit 153, a haptic module 154, and the like.

The display unit 151 may display (output) information processed in the mobile terminal 100. For example, when the mobile terminal 100 is operated in a phone call mode, the display unit 151 may display a user interface (UI) or graphic user interface (GUI) related to a phone call. When the mobile terminal 100 is operated in a video call mode or image capturing mode, the display unit 151 may display a captured image, a received image, UI, GUI, or the like.

The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

At least one of those displays (or display devices) included in the display unit 151 may be configured with a transparent or optical transparent type to allow the user to view the outside therethrough. It may be referred to as a transparent display. A representative example of the transparent display may be a transparent OLED (TOLED), and the like. Under this configuration, the user can view an object positioned at a rear side of the mobile device body through a region occupied by the display unit 151 of the mobile device body.

There may exist two or more display units 151 according to the implementation of the mobile terminal 100. For example, a plurality of the display units 151 may be placed on one surface in a separate or integrated manner, or may be place on different surfaces, respectively.

The audio output module 152 outputs audio data received from the wireless communication unit 110 or stored in the memory 160, in a call-receiving mode, a call-placing mode, a recording mode, a voice selection mode, a broadcast reception mode, and the like. The audio output module 152 outputs an audio signal related to a function performed in the mobile terminal 100 (for example, sound alarming a call received or a message received, and the like). The audio output module 152 may include a receiver, a speaker, a buzzer, and the like.

The alarm unit 153 outputs signals notifying the occurrence of an event from the mobile terminal 100. The examples of an event occurring from the mobile terminal 100 may include a call received, a message received, a key signal input, a touch input, and the like. The alarm unit 153 outputs not only video or audio signals, but also other types of signals such as signals for notifying the occurrence of an event in a vibration manner. Since the video or audio signals may be also output through the display unit 151 or the audio output unit 153, the display unit 151 and the audio output module 152 may be categorized into part of the alarm unit 153.

The haptic module 154 generates various tactile effects that can be felt by the user. A representative example of the tactile effects generated by the haptic module 154 may include vibration. Vibration generated by the haptic module 154 may have a controllable intensity, a controllable pattern, and the like. For example, different vibrations may be output in a synthesized manner or in a sequential manner.

The haptic module 154 may generate various tactile effects, including not only vibration, but also arrangement of pins vertically moved with respect to a skin surface being touched, air injection force or air suction force through an injection port or suction port, touch by a skin surface, contact with an electrode, effects by stimulus such as an electrostatic force, reproduction of cold or hot feeling using a heat absorbing device or heat emitting device, and the like.

The haptic module 154 may be configured to transmit tactile effects through the user's direct contact, or the user's muscular sense using a finger or a hand. Two or more haptic modules 155 may be provided according to the configuration of the mobile terminal 100.

The memory 160 may store a program for operating the controller 180, or temporarily store input/output data (for example, phonebooks, messages, still images, moving images, and the like). The memory 160 may store data related to various patterns of vibrations and sounds output when performing a touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

The interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing related to telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize a handwriting or drawing input on the touch screen as text or image.

The power supply unit 190 may receive external or internal power to provide power required by various components under the control of the controller 180. In particular, the power supply unit 190 includes a power supply receiver 191 for wirelessly receiving power from an external charger.

Various embodiments described herein may be implemented in a computer or similar device readable medium using software, hardware, or any combination thereof.

For a hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some instances, such embodiments may be implemented in the controller 180 itself.

For a software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, the method of processing a user input to the mobile terminal 100 will be described. The user input unit 130 is manipulated to receive a command for controlling the operation of the mobile terminal 100, and may include a plurality of manipulation units. The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in the form of a character, a numeral, a symbol, a graphic, an icon, and the like. For an input of the visual information, at least one of a character, a numeral, a symbol, a graphic, and an icon may be displayed with a predetermined arrangement so as to be implemented in the form of a keypad. Such a keypad may be referred to as a so-called "soft key."

The display unit 151 may operate on an entire region or operate by dividing into a plurality of regions. In case of the latter, the plurality of regions may be configured to operate in an associative way. For example, an output window and an input window may be displayed on the upper and lower portions of the display unit 151, respectively. The output window and the input window may be regions allocated to output or input information, respectively. A soft key on which numerals for inputting a phone number or the like are displayed is output on the input window. When the soft key is touched, a numeral corresponding to the touched soft key is displayed on the output window. When the first manipulating unit is manipulated, a phone call connection for the phone number displayed on the output window will be attempted or a text displayed on the output window will be entered to the application.

The display unit 151 or touch pad may be configured to sense a touch scroll. The user may move an object displayed on the display unit 151, for example, a cursor or pointer placed on an icon or the like, by scrolling the display unit 151 or touch pad. Moreover, when a finger is moved on the display unit 151 or touch pad, a path being moved by the finger may be visually displayed on the display unit 151. It may be useful to edit an image displayed on the display unit 151.

In order to cope with a case where the display unit 151 and touch pad are touched together within a predetermined period of time, one function of the terminal 100 may be implemented. For the case of being touched together, there is a case when the user clamps a body of the mobile terminal 100 using his or her thumb and forefinger. For one of the above functions implemented in the mobile terminal 100, for example, there may be an activation or de-activation for the display unit 151 or touch pad.

Figure 2B:
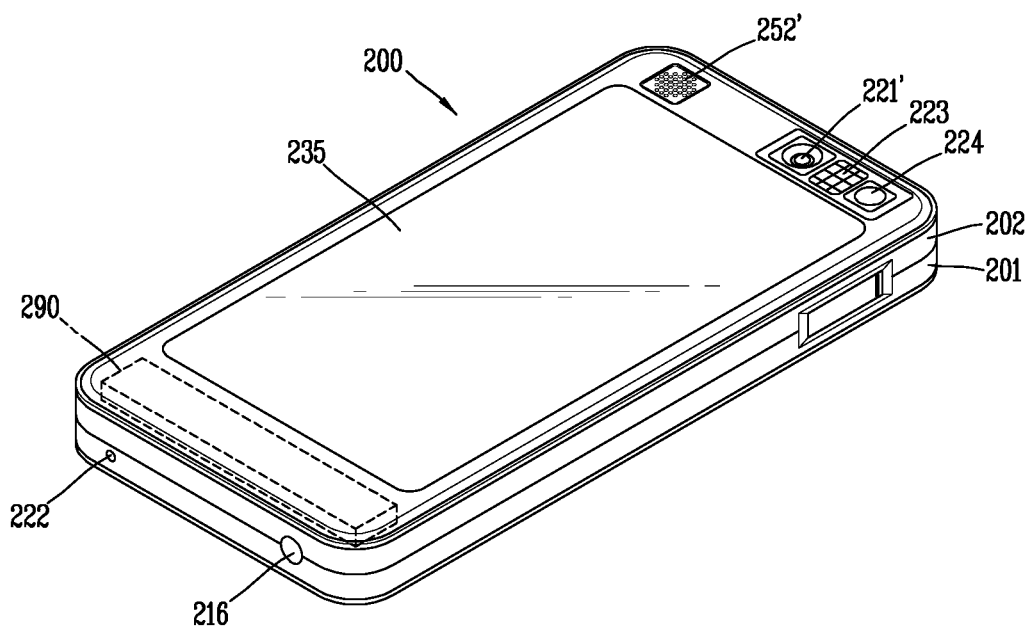

Next, FIGS. 2A and 2B are perspective views illustrating the external appearance of a mobile terminal 200 according to an embodiment of the present invention. FIG. 2A is a front and a side view illustrating the mobile terminal 200, and FIG. 2B is a rear and the other side view illustrating the mobile terminal 200.

Referring to FIG. 2A, the mobile terminal 200 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. In this embodiment, the case may be divided into a front case 201 and a rear case 202. Various electronic components may be integrated in a space formed between the front case 201 and the rear case 202. At least one middle case may be additionally disposed between the front case 201 and the rear case 202.

The cases may be formed by injection-molding a synthetic resin or may be also formed of a metal material such as stainless steel (STS), titanium (Ti), or the like.

A display unit 251, an audio output module 252, a camera 221, a user input unit 230, a microphone 222, an interface 270, and the like may be arranged on the terminal body, mainly on the front case 201.

The display unit 251 occupies a most portion of the front case 201. The audio output unit 252 and the camera 221 are disposed on a region adjacent to one of both ends of the display unit 251, and the user input unit 231 and the microphone 222 are disposed on a region adjacent to the other end thereof. The user interface 232 and the interface 270, and the like, may be disposed on a lateral surface of the front case 201 and the rear case 202.

The user input unit 230 is manipulated to receive a command for controlling the operation of the portable terminal 200. The user input unit 230 may include a plurality of manipulation units 231, 232.

The manipulation units 231, 232 may receive various commands. For example, the first manipulation unit 231 may be used to receive a command, such as start, end, scroll, or the like. The second manipulation unit 232 may be used to receive a command, such as controlling a volume level being output from the audio output unit 252, or switching it into a touch recognition mode of the display unit 251.

Referring to FIG. 2B, a camera 221' may be additionally mounted on a rear surface of the terminal body, namely, the rear case 202. The rear camera 221' has an image capturing direction, which is substantially opposite to the direction of the front camera 221 (refer to FIG. 2A), and may have different number of pixels from those of the front camera 221.

For example, that the front camera 221 may be configured to have a relatively small number of pixels, and the rear camera 221' may be configured to have a relatively large number of pixels. Accordingly, when the front camera 221 is used for video communication, it may be possible to reduce the size of transmission data when the user captures his or her own face and sends it to the other party in real time. On the other hand, the rear camera 221' may be used for the purpose of storing high quality images.

On the other hand, the cameras 221, 221' may be provided in the terminal body in a rotatable and popup manner.

Furthermore, a flash 223 and a mirror 224 may be additionally disposed adjacent to the rear camera 221'. The flash 223 illuminates light toward an object when capturing the object with the camera 221'. The mirror 224 allows the user to look at his or her own face, or the like, in a reflected way when capturing himself or herself (in a self-portrait mode) by using the rear camera 221'.

Furthermore, a rear audio output unit 252' may be additionally disposed on a rear surface of the terminal body. The rear audio output unit 252' together with the front audio output unit 252 (refer to FIG. 2A) can implement a stereo function, and it may be also used to implement a speaker phone mode during a phone call.

Furthermore, an antenna 216 for receiving broadcast signals may be additionally disposed on a lateral surface of the terminal body. The antenna 216 constituting part of a broadcast receiving module 111 (refer to FIG. 1) may be provided so as to be pulled out from the terminal body.

Furthermore, a power supply unit 290 for supplying power to the portable terminal 200 may be mounted on the terminal body. The power supply unit 290 may be configured so as to be incorporated in the terminal body, or directly detachable from the outside of the terminal body.

A touch pad 235 for detecting a touch may be additionally mounted on the rear case 202. The touch pad 235 may be also configured with an optical transmission type, similarly to the display unit 251 (refer to FIG. 2A). Alternatively, a rear display unit for displaying visual information may be additionally mounted on the touch pad 235. At this time, information displayed on the both surfaces of the front display unit 251 and rear display unit may be controlled by the touch pad 235.

The touch pad 235 may be operated in conjunction with the display unit 251 of the front case 201. The touch pad 235 may be disposed in parallel at a rear side of the display unit 251. The touch pad 235 may have the same size as or a smaller size than the display unit 251.

On the other hand, as the mobile terminal becomes more advanced in its performance, the battery consumption of the mobile terminal has been abruptly increased. However, the user wants to use the mobile terminal for a longer period of time as well as have the high performance of the mobile terminal. Accordingly, in order to satisfy the user's request, studies on wireless charging technologies are being performed.

Figure 3:
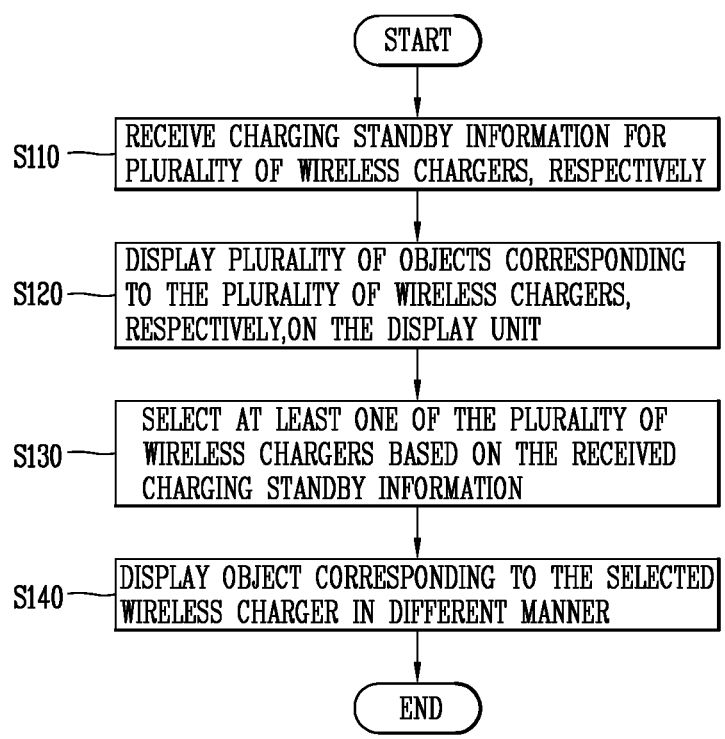
FIG. 3 is a flow chart illustrating a method of controlling a mobile terminal according to an embodiment of the present invention.

Next, FIG. 3 is a flow chart illustrating a method of controlling a mobile terminal 100 (refer to FIG. 1) according to an embodiment of the present invention. The mobile terminal 100 may include a wireless communication unit 110, a power receiver, a display unit 151, and a controller 180 as described in FIG. 1.

Referring to FIG. 3, the controller 180 receives charging standby information for a plurality of wireless chargers (S110). Further, the wireless charger may include a wireless charging pad, a wireless charging tower, and/or a wireless charging device. The wireless charging pad may include a desk pad and/or a car pad. In addition, the wireless charger may include all devices with a scheme of winding a coil around a charging place to make magnetic fields, and flowing electric currents into an object desired to be charged using magnetic fields to charge the object.

When a plurality of wireless chargers are sensed, the wireless communication unit 110 may receive charging standby information for the plurality of wireless chargers, respectively, from a server or the plurality of wireless chargers. Meanwhile, even when the plurality of wireless chargers are not sensed, the wireless communication unit 110 may receive charging standby information for the plurality of wireless chargers from the server.

The wireless charger may sense the mobile terminal 100 according to a change of current flowing through the coil. The wireless charger may perform an analog pin process and a digital ping process to sense that the mobile terminal 100 is located on the wireless charger.

Here, the analog ping process denotes a process of recognizing a device existing on the wireless charger by varying a current flowing through the coil based on the device existing on the wireless charger when a short pulse signal of the response frequency is periodically transmitted from the transmitter to the coil (Tx coil). In other words, the response frequency is shifted when the device exists on the wireless charger, and thus a relatively low current flows through the coil. At this time, the transmitter can sense that the device exists on the wireless charger when a current value of the current flowing through the coil is less than a threshold value.

Furthermore, the digital ping process denotes a process of allowing the transmitter to sense a device existing on the wireless charger, and then actually sending minimum power to the device to start communication with the device. At this time, when a first packet is not received for a predetermined period of time to start communication, the digital ping process is terminated and returned to the analog ping process again.

As described above, the mobile terminal 100 received power from the wireless charger may receive charging standby information on the wireless charger from the wireless charger or server. Here, the charging standby information may include at least one of a number of users to wait for receiving power in a wireless manner from the wireless charger and a standby time for receiving power in a wireless manner from the wireless charger.

Next, the controller 180 displays a plurality of objects corresponding to a plurality of wireless chargers (S120). Specifically, the controller 180 may display a plurality of objects corresponding to the plurality of wireless chargers, respectively, on the display unit 151. Here, the object may include at least one of an icon, a widget, a thumbnail image and an application execution menu.

The controller 180 may display charging standby information on the plurality of wireless chargers, respectively, along with the plurality of objects corresponding to the plurality of wireless chargers, respectively, on the display unit 151. Further, at least one of the plurality of wireless chargers is selected based on the received charging standby information (S130) and the controller 1890 displays an object corresponding to the selected wireless charger in a different manner (S140).

Specifically, the controller 180 may select at least one of a plurality of wireless chargers. At this time, a wireless charger to be selected may be determined based on at least one of a number of users to wait for receiving power in a wireless manner from the wireless charger and a standby time for receiving power in a wireless manner from the wireless charger.

The controller 180 may display an object corresponding to the selected wireless charger in a different manner to distinguish it from the other objects. For example, the controller 180 may change the size, shape or color of an object corresponding to the selected wireless charger. Then, the controller 180 may control a power receiver 191 to receive power in a wireless manner from the selected wireless charger.

At this time, the display unit 151 may include an immediate charging menu and/or a reserved charging menu. The controller 180 may immediately receive power in a wireless manner from the selected wireless charger when the immediate charging menu is selected, and receive power in a wireless manner from the selected wireless charger after a predetermined period of time has passed when the reserved charging menu is selected.

On the other hand, when a touch input to any one of the plurality of objects is sensed, the controller 180 may control the power receiver 191 to receive power in a wireless manner from a wireless charger corresponding to the touched object. Similarly, the controller 180 may immediately receive power in a wireless manner from a wireless charger corresponding to the touched object when the immediate charging menu is selected, and receive power in a wireless manner from a wireless charger corresponding to the touched object after a predetermined period of time has passed when the reserved charging menu is selected.

The power receiver 191 may be configured to sense a wireless charging area, and receive power (wireless power) delivered from a wireless power transmitter (hereinafter, referred to as a "wireless charger") corresponding to the sensed wireless charging area. At this time, the wireless power may be delivered using a wireless power transmission method such as an inductive coupling method, a resonant coupling method, or a mixing method thereof.

The power receiver 191 may include constituent elements required to receive wireless power according to the foregoing wireless power transmission methods. For example, the power receiver 191 may include a coil for receiving wireless power in the form of a magnetic field or electromagnetic field having a resonant characteristic.

Specifically, the power receiver 191 may include a secondary coil for inducing a current by changing a magnetic field as a constituent element based on the inductive coupling method. Furthermore, the power receiver 191 may include a coil or resonant circuit for generating a resonant phenomenon by an electromagnetic field having a specific resonant frequency as a constituent element based on the resonant coupling method.

The power receiver 191 may charge a battery using power supplied or transmitted from the wireless charger. At this time, the power receiver 191 may control a charging voltage, a charging current, a charging speed, and the like. The power receiver 191 may receive power as much as the determined amount of power, namely, an amount of power required to execute the selected applications.

As described above, according to an embodiment of the present invention, at least one of a plurality of wireless chargers may be recommended based on charging standby information on the plurality of wireless chargers, respectively. Accordingly, the mobile terminal 100 may automatically receive power from the recommended wireless charger even without the user's selection. As a result, it may be possible to enhance the user's convenience.

Furthermore, according to an embodiment of the present invention, an amount of power to be received may be determined based on the user's selection for an application. In other words, it may be possible to charge power as much as an amount of power required to execute the selected application. Accordingly, public power resources may be effectively used.

Next, FIGS. 4A through 4D are conceptual views illustrating a first operation example of the mobile terminal 200 according to FIG. 3. Specifically, FIGS. 4A through 4D are conceptual views illustrating an example in which the mobile terminal 200 displays charging standby information received from wireless chargers.

The mobile terminal 200 may be disposed adjacent to a wireless charger 300 (see FIG. 5). The wireless charger 300 may perform communication with a network server and be connected to a network communication device having a communication function in a direct or indirect manner to perform communication with a network server. Additionally, the mobile terminal 200 may perform communication with a network server using at least one of Wi-Fi, a 3G network and a 4G network. Accordingly, an icon 252 indicating that communication with a network server is being performed using Wi-Fi may be displayed on the display unit 251.

Figure 4A:
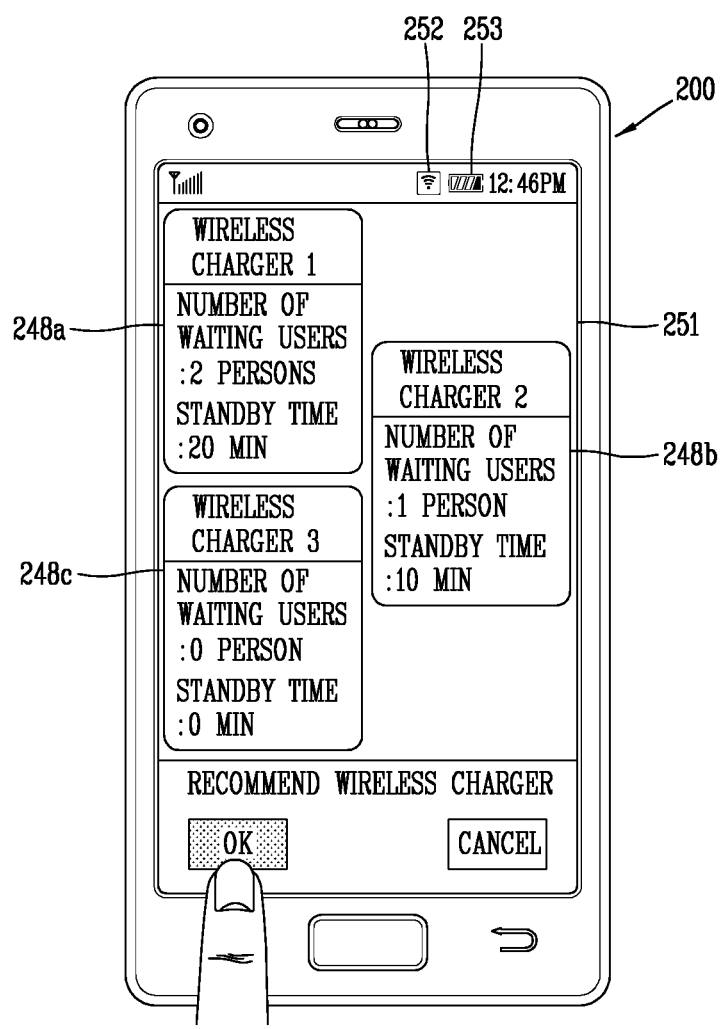
FIGS. 4A through 4D are conceptual views illustrating a first operation example of the mobile terminal according to FIG. 3.

Referring to FIG. 4A, the controller 180 displays a plurality of display objects 248a-248c corresponding to a plurality of wireless chargers, respectively, on the display unit 251. Furthermore, the controller 180 may display charging standby information on a plurality of wireless chargers, respectively, on the display unit 251. Here, the charging standby information may include a number of users waiting to receive power in a wireless manner from the wireless charger and a standby time for receiving power in a wireless manner from the wireless charger.

Figure 4B:
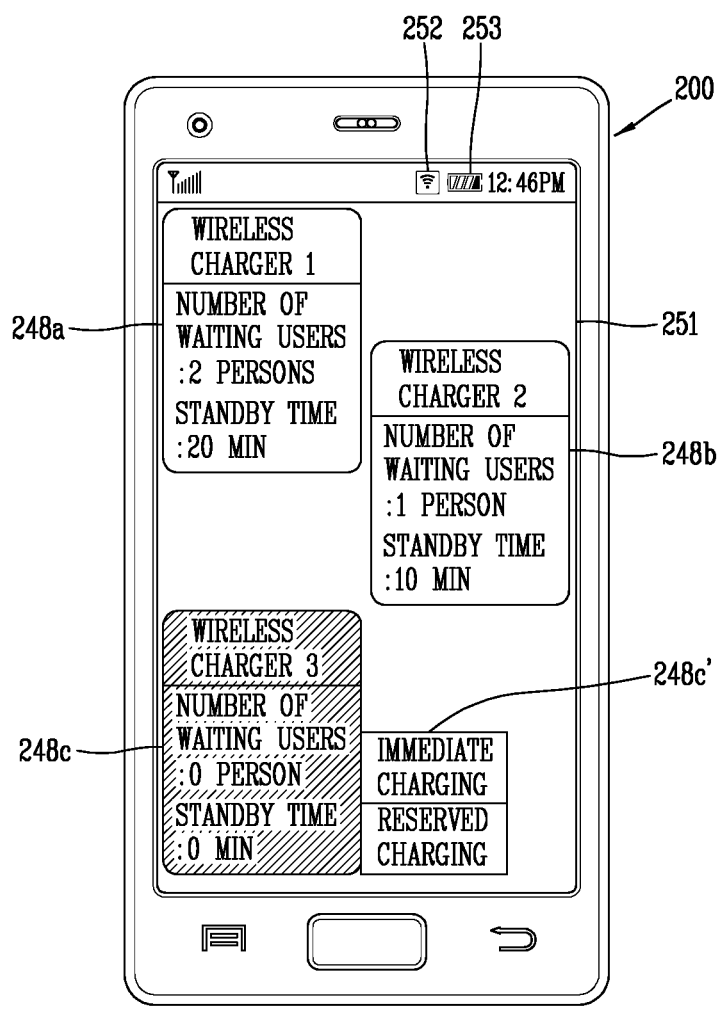

At this time, when a touch input to an icon corresponding to a function for recommending a wireless charger is sensed, referring to FIG. 4B, the controller 180 selects at least one a plurality of wireless chargers based on the charging standby information. The controller 180 may display an object 248c corresponding to the selected wireless charger in a different manner to distinguish it from the other objects. For example, the object 248c corresponding to the selected wireless charger may be displayed in a different color from the other objects.

The display unit 251 may display a menu 248c' including an icon (hereinafter, referred to as an "immediate charging menu") corresponding to a function for immediately receiving power from the selected wireless charger and an icon (hereinafter, referred to as a "reserved charging menu") corresponding to a function of receiving power after a predetermined period of time has passed.

Figure 4C:
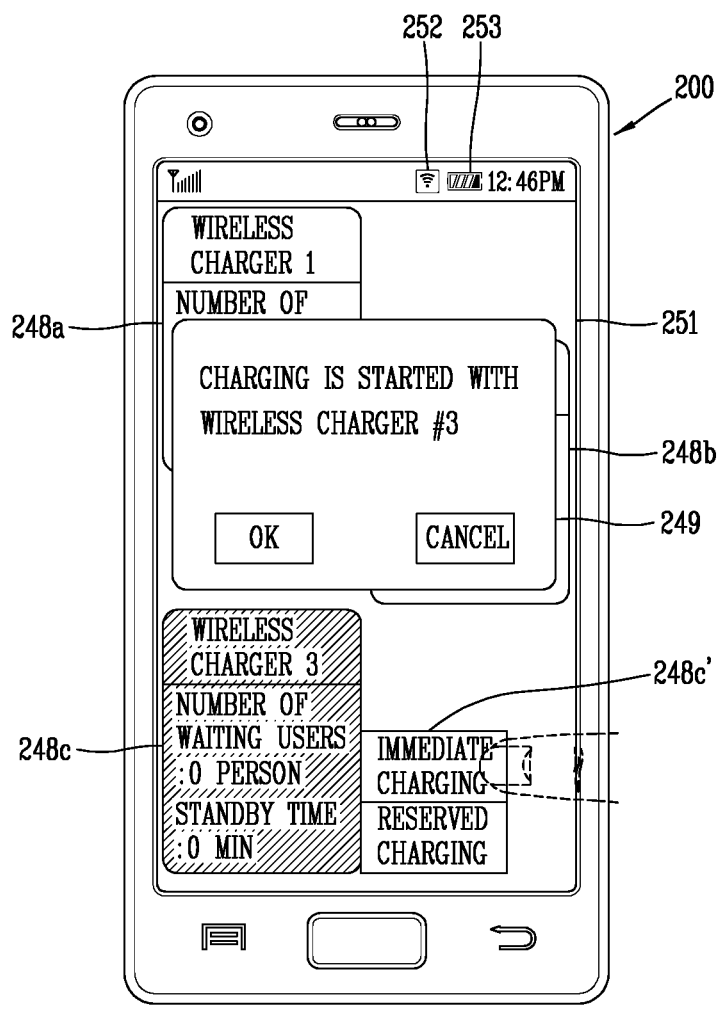

When a touch input to the immediate charging menu is sensed, referring to FIG. 4C, the controller 180 immediately receives power in a wireless manner from the selected wireless charger. The controller 180 may also display a message 249 notifying that the power is immediately received from the selected wireless charger. Furthermore, the controller 180 may display an icon 253 indicating that wireless charging is being performed on the display unit 251.

Figure 4D:
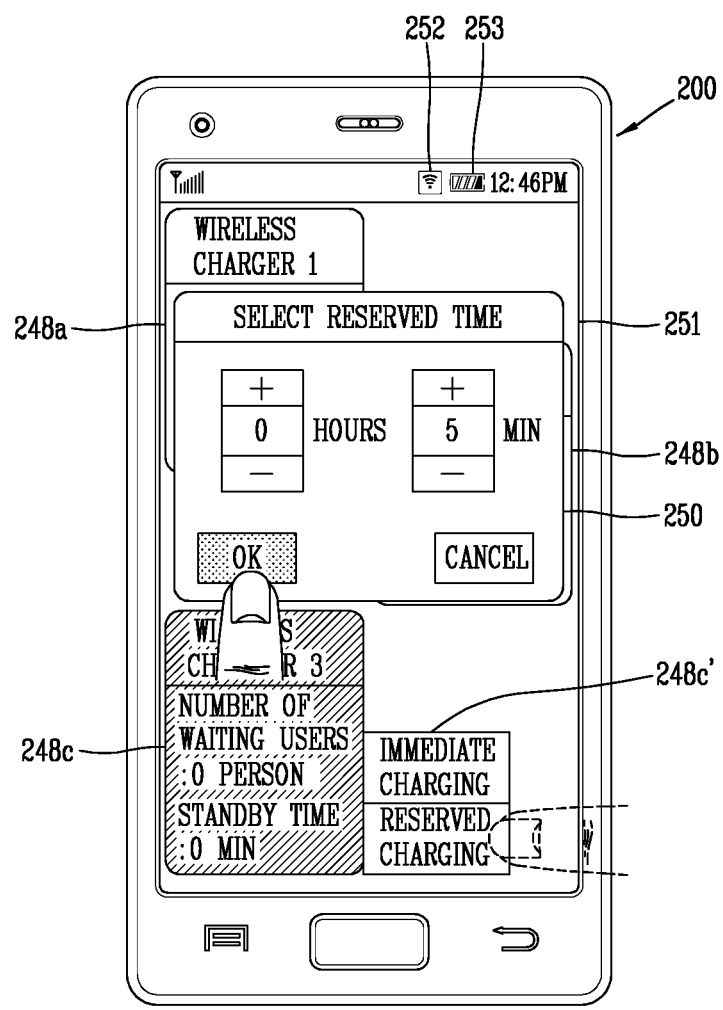

On the contrary, when a touch input to the reserved charging menu is sensed, referring to FIG. 4D, the controller 180 may display a popup window 250 for setting a reserved time on the display unit 251. The user can then set a reserved time on the popup window 250.

As shown, the reserved time may be set based on a touch input to either one of the icon (+) or icon (−), and may be set based on an input to either one of the side-up key or side-down key. Furthermore, the reserved time may be set based on an input to a physical keypad or a touch input to a virtual keypad.

Then, the controller 180 can receive power from the selected wireless charger after a predetermined reserved time has passed. At this time, the display unit 251 may display a message notifying that power is received from the selected wireless charger.

Figure 5A:
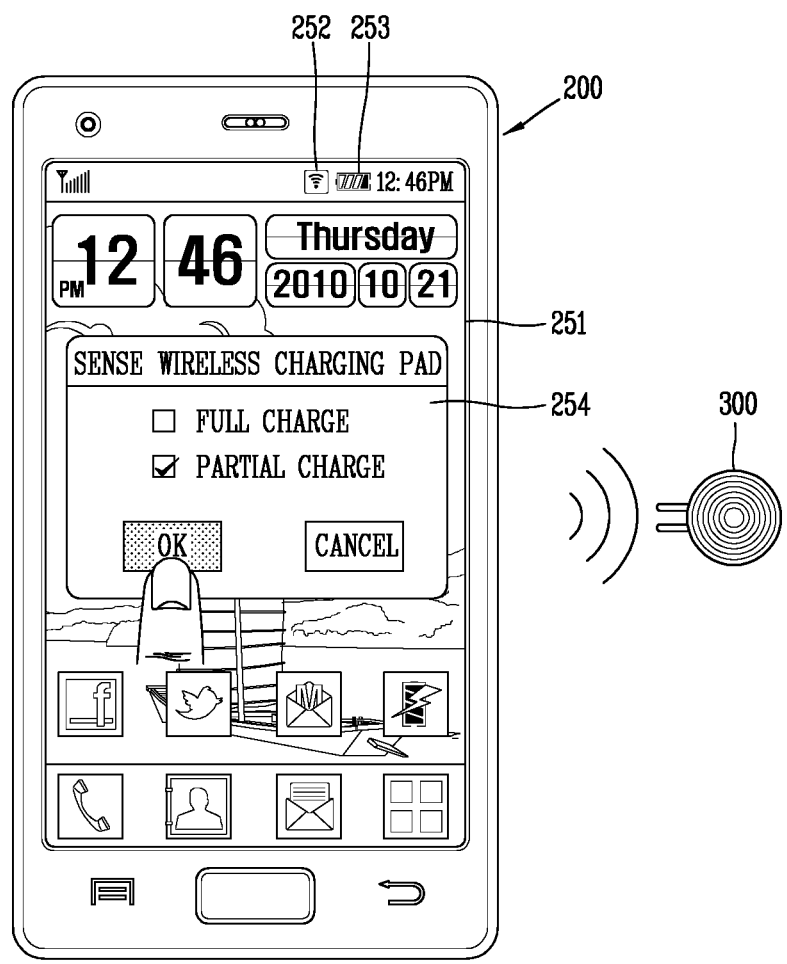
FIGS. 5A through 5C are conceptual views illustrating a second operation example of the mobile terminal according to FIG. 3.
Figure 5B:
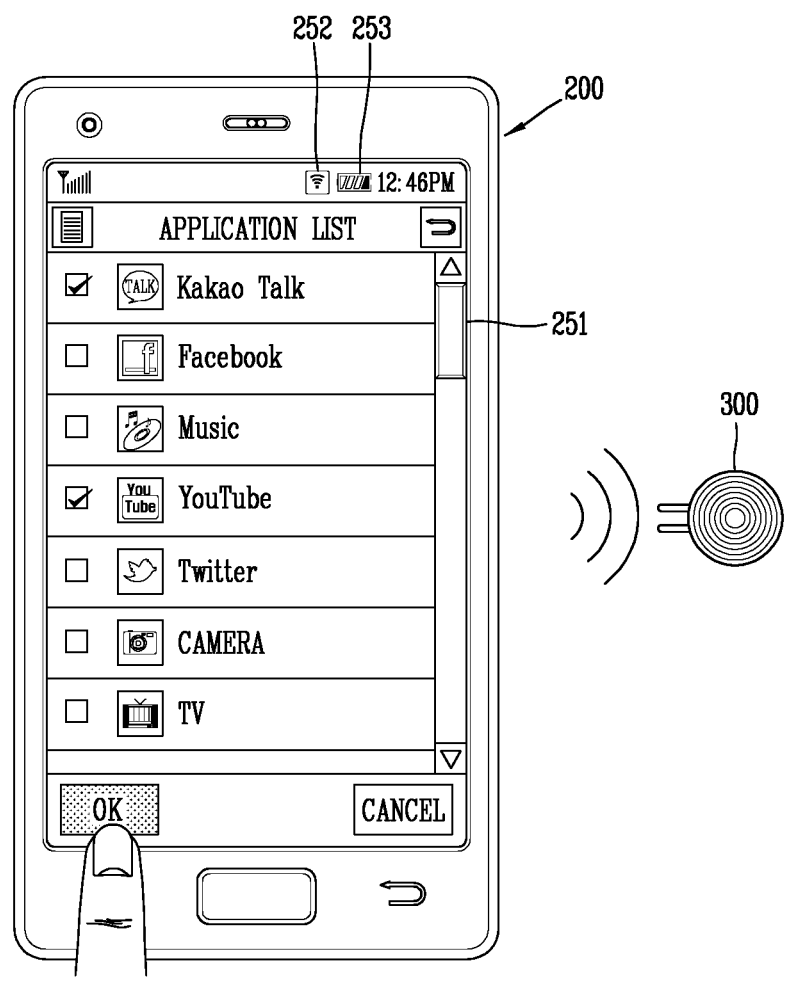
Figure 5C:
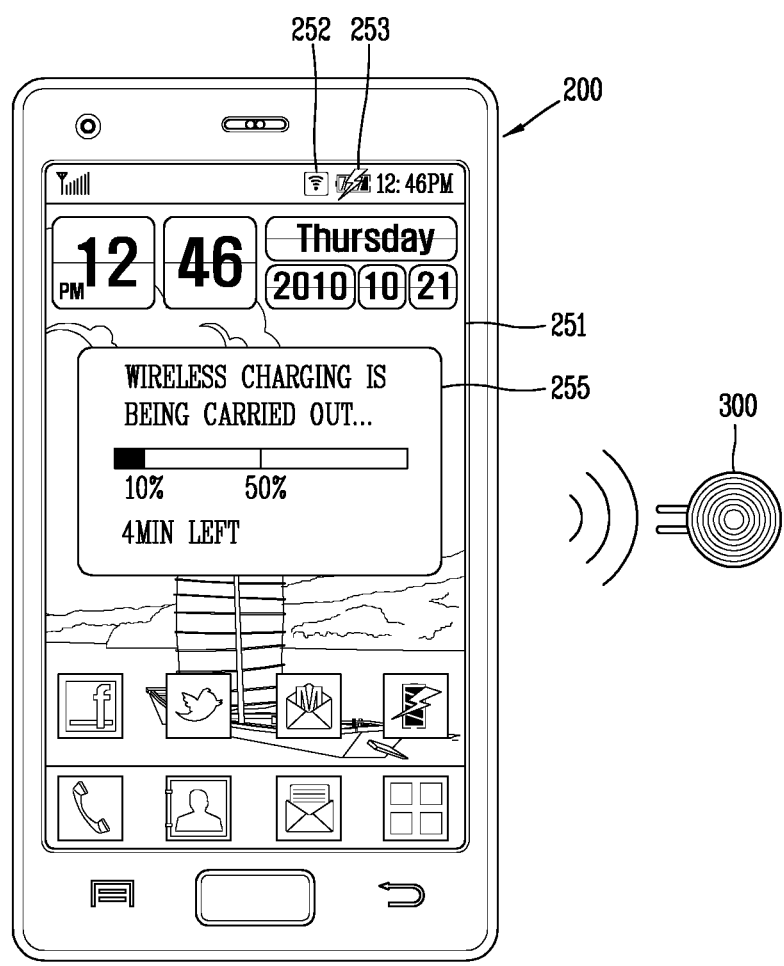

Next, FIGS. 5A through 5C are conceptual views illustrating a second operation example of the mobile terminal 200 according to FIG. 3. Specifically, FIGS. 5A through 5C are conceptual views illustrating an example in which the mobile terminal 200 determines an amount of power to be received based on the user's selection.

Referring to FIG. 5A, a wireless charger 300 can sense the mobile terminal 200 according to a change of current flowing through the coil, and the mobile terminal 200 can receive minimum power from the wireless charger 300 to sense the wireless charger 300. Meanwhile, the mobile terminal 200 and wireless charger 300 can sense each other using at least one of Near Field Communication (NFC), Bluetooth communication, infrared communication, and Zigbee communication.

When the wireless charger 300 is sensed, the controller 180 of the mobile terminal 200 displays a message 254 including a full charge menu and a partial charge menu as information associated with the selection of an amount of power on the display unit 251.

At this time, when the partial charge menu is selected, referring to FIG. 5B, the controller 180 displays a list of applications as information associated with the selection of an amount of power on the display unit 251. When at least some of the applications contained in the list are selected, the controller 180 determines an amount of power to be received based on the amount of power required to execute the selected applications.

Then, referring to FIG. 5C, the controller 180 controls the power receiver 191 to receive power in a wireless manner from the wireless charger 300 based on the determined amount of power. At this time, the controller 180 displays an icon 253 indicating that the wireless charging is being performed. Furthermore, the controller 180 displays a progress bar for at least one of an amount of power to be received and an amount of power that has been received on the display unit 251, and may also display expected charging time information.

On the other hand, when the wireless charger 300 is sensed, the wireless communication unit 110 of the mobile terminal 200 may transmit a message notifying that wireless charging is started. Furthermore, when the power receiver 191 receives power in a wireless manner as much as the determined amount of power from the wireless charger 300, the wireless communication unit 110 may transmit a message notifying that wireless charging has been completed to the wireless charger 300.

Figure 6A:
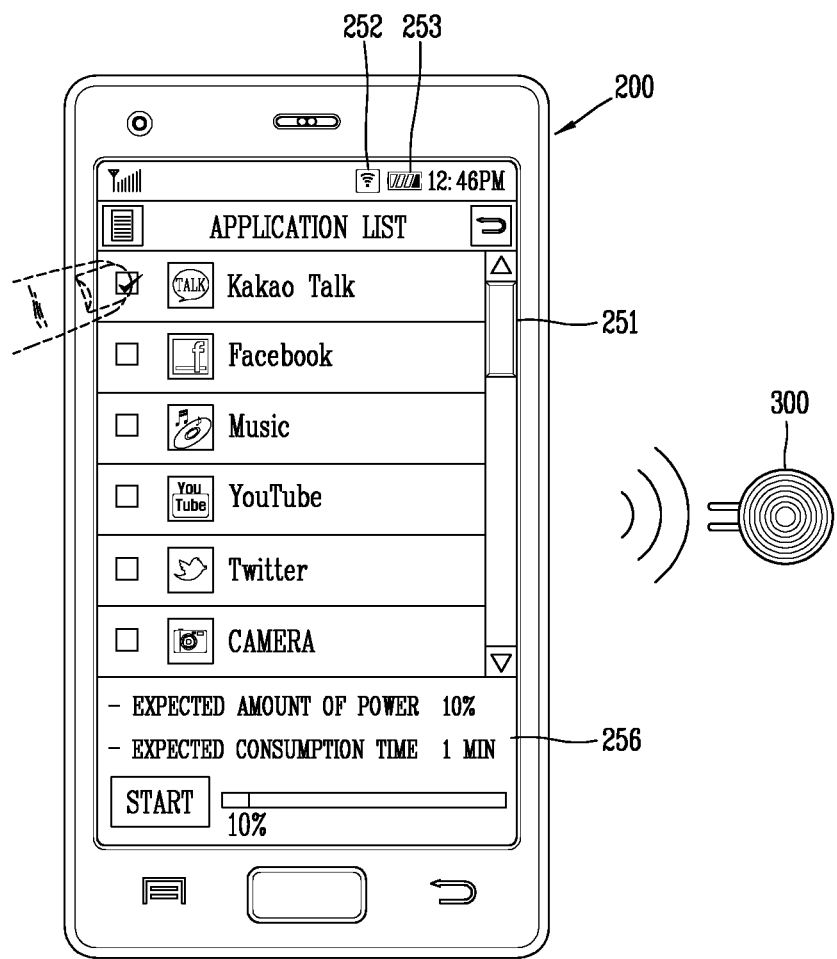
FIGS. 6A through 6C are conceptual views illustrating a third operation example of the mobile terminal according to FIG. 3.
Figure 6B:
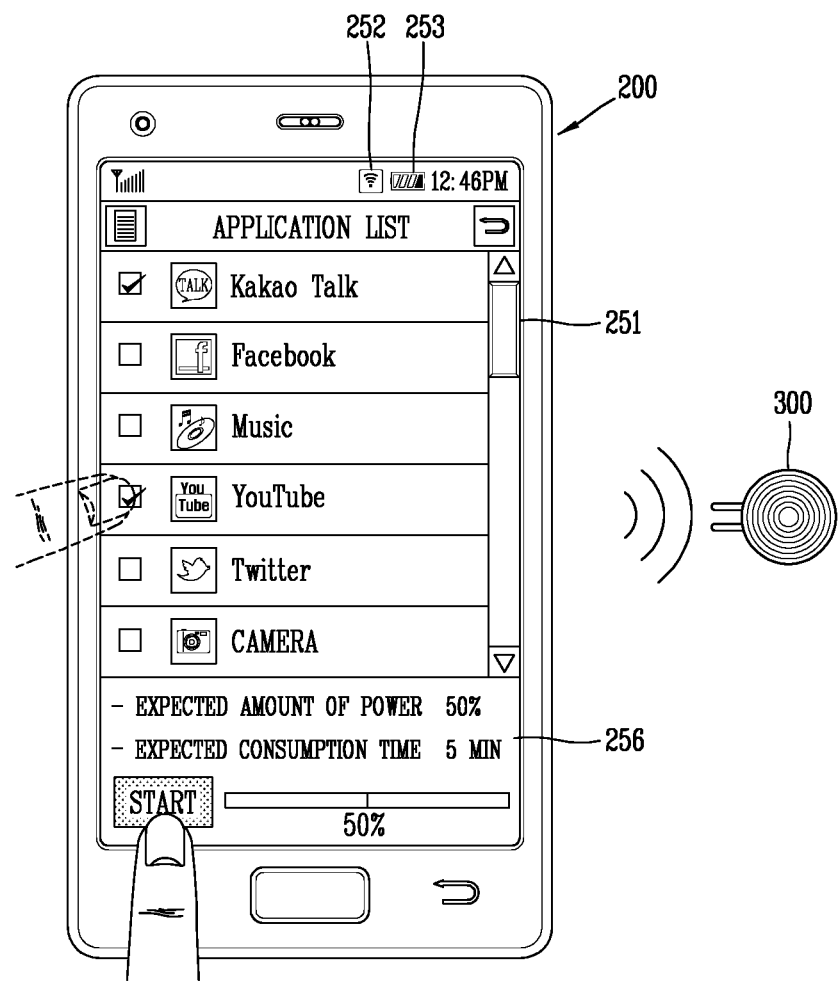
Figure 6C:
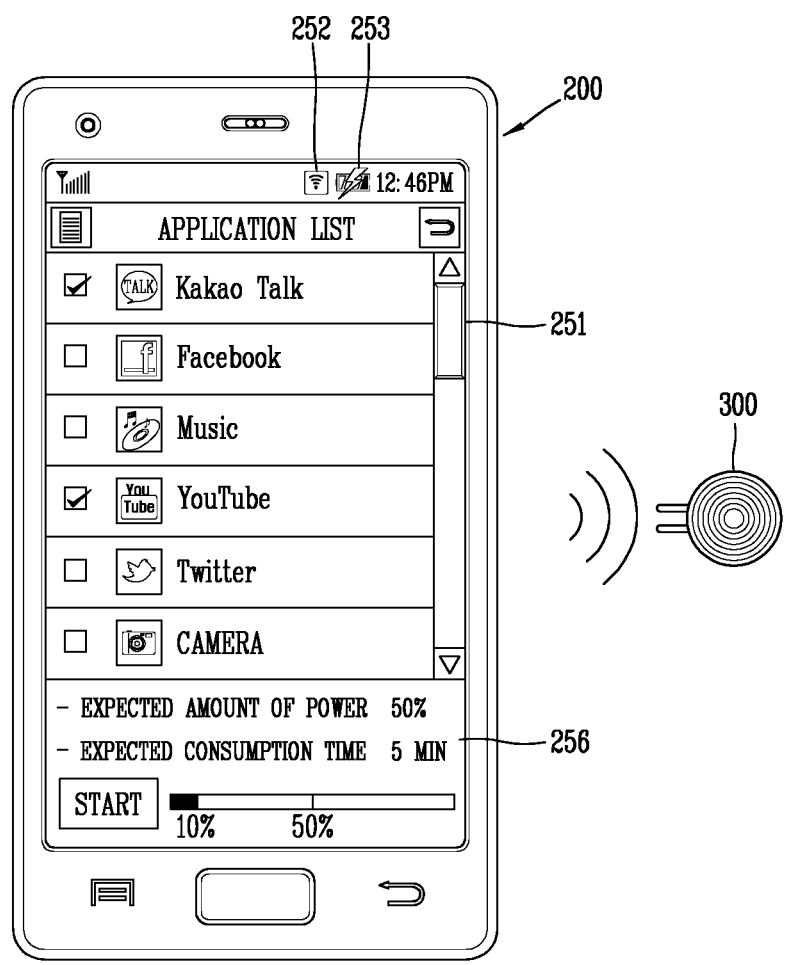

Next, FIGS. 6A through 6C are conceptual views illustrating a third operation example of the mobile terminal 200 according to FIG. 3. Specifically, FIGS. 6A through 6C are conceptual views illustrating an example in which the mobile terminal 200 determines an amount of power to be received based on the user's selection.

The mobile terminal 200 includes the power receiver 191 (refer to FIG. 1), a display unit 251, and a controller 180 (refer to FIG. 1). The mobile terminal 200 may also be disposed adjacent to the wireless charger 300. Referring to FIGS. 6A and 6B, the controller 180 displays a list of applications as information associated with the selection of an amount of power on the display unit 251. When at least one of the applications contained in the list is selected, the controller 180 displays a message 256 containing at least one of power energy information and expected charging time information, which are required to execute the selected application on the display unit 251.

At this time, as illustrated in the drawing, the power energy information required to execute the selected application may be displayed on the display unit 251 in the form of a progress bar. The controller 180 may determine an amount of power to be received based on the amount of power required to execute the selected applications.

Then, referring to FIG. 6C, the controller 180 controls the power receiver 191 to receive power in a wireless manner from the wireless charger 300 based on the determined amount of power. At this time, the controller 180 displays an icon 253 indicating that wireless charging is being performed on the display unit 251.

Next, FIGS. 7A through 7D are conceptual views illustrating a fourth operation example of the mobile terminal 200 according to FIG. 3. Specifically, FIGS. 7A through 7D are conceptual views illustrating an example in which the mobile terminal 200 determines an amount of power to be received based on a condition information.

Figure 7A:
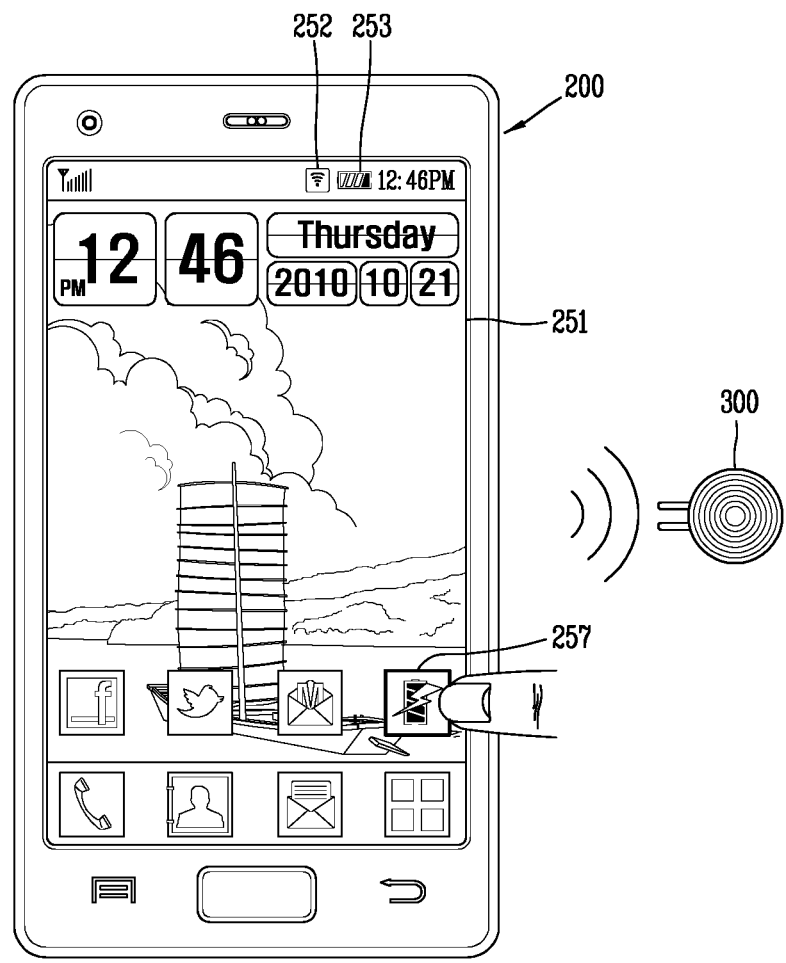
FIGS. 7A through 7D are conceptual views illustrating a fourth operation example of the mobile terminal according to FIG. 3.

The mobile terminal 200 includes a power receiver 191 (refer to FIG. 1), a display unit 251, and a controller 180 (refer to FIG. 1). The mobile terminal 200 may also be disposed adjacent to the wireless charger 300. Referring to FIG. 7A, an icon 257 associated with wireless charging is displayed on the display unit 251. When a touch input to the icon 257 is sensed, the controller 180 receives a control command for selecting an amount of power to be received.

Figure 7B:
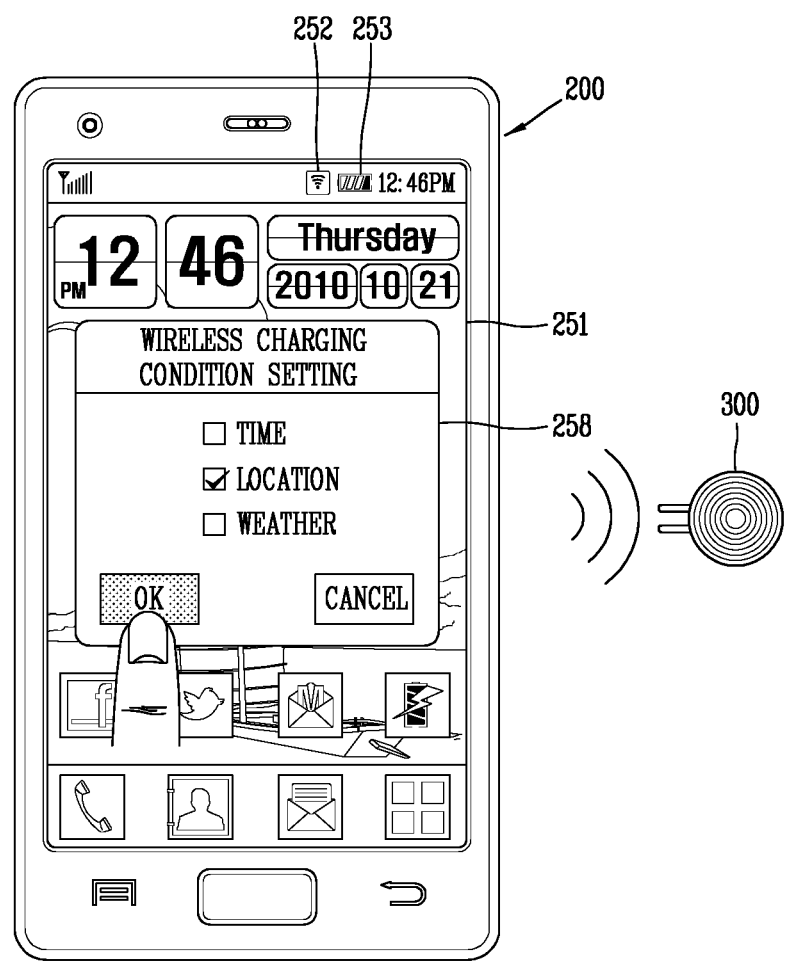

Here, referring to FIG. 7B, the controller 180 displays a message 258 for selecting at least one of time information, location information and weather information as a menu (hereinafter, referred to as a "wireless charging condition setting menu") for selecting an amount of power to be received during wireless charging on the display unit 251. On the other hand, when the mobile terminal 200 senses the wireless charger 300 even without a touch input to the icon 257, a message containing a wireless charging condition setting menu may be automatically displayed on the display unit 251.

Figure 7C:
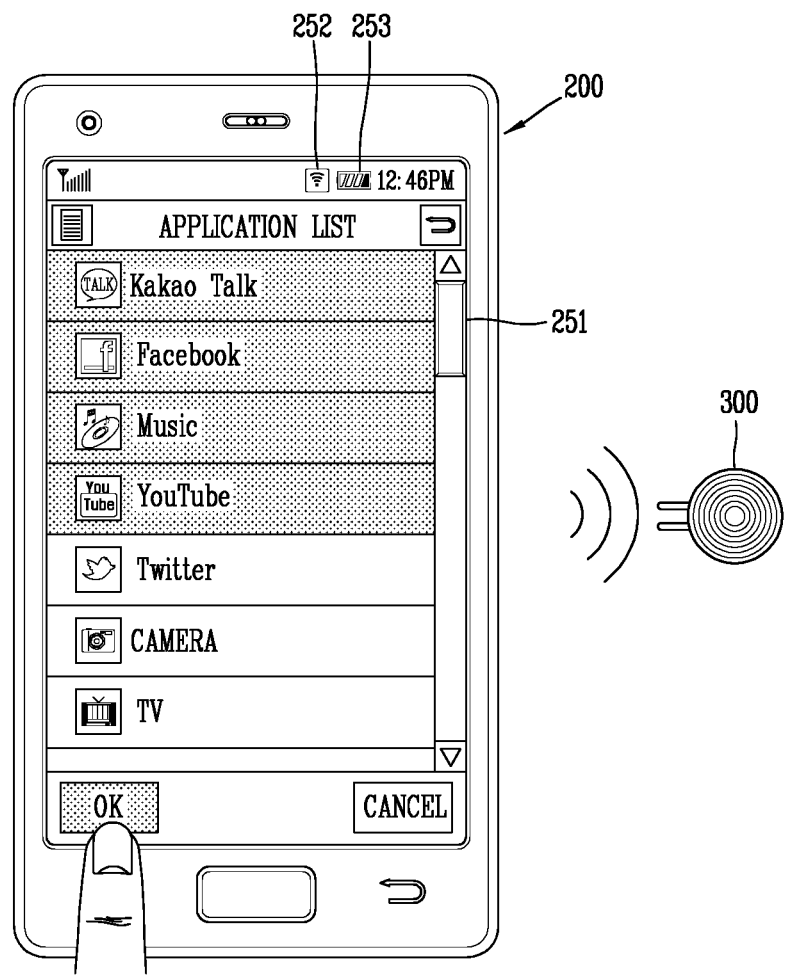

At this time, for example, when the location information is selected from the message 258, referring to FIG. 7C, the controller 180 may select at least some of applications based on the location information. The controller 180 may determine an amount of power to be received based on the amount of power required to execute the selected applications. On the other hand, the controller 180 may select at least some of applications based on the location information, and then release the selection of the selected applications or select other applications.

Figure 7D:
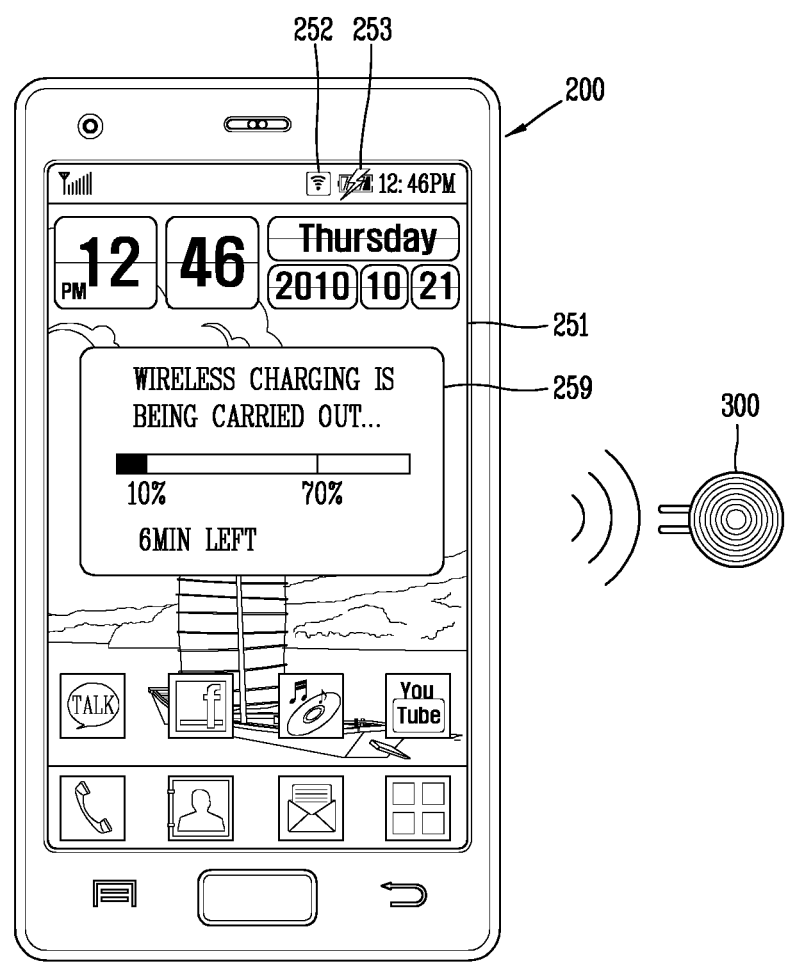

Then, referring to FIG. 7D, the controller 180 controls the power receiver 191 to receive power in a wireless manner from the wireless charger 300 based on the determined amount of power. At this time, the controller 180 displays an icon 253 indicating that wireless charging is being performed on the display unit 251. Furthermore, the controller 180 displays a progress bar for at least one of an amount of power to be received and an amount of power that has been received on the display unit 251, and may also display expected charging time information.

Furthermore, the controller 180 may change the arrangement of applications displayed on the display unit 251 to enhance the user's accessibility for the selected applications. For example, as illustrated in the drawing, the selected applications may be disposed on the home screen.

Figure 8A:
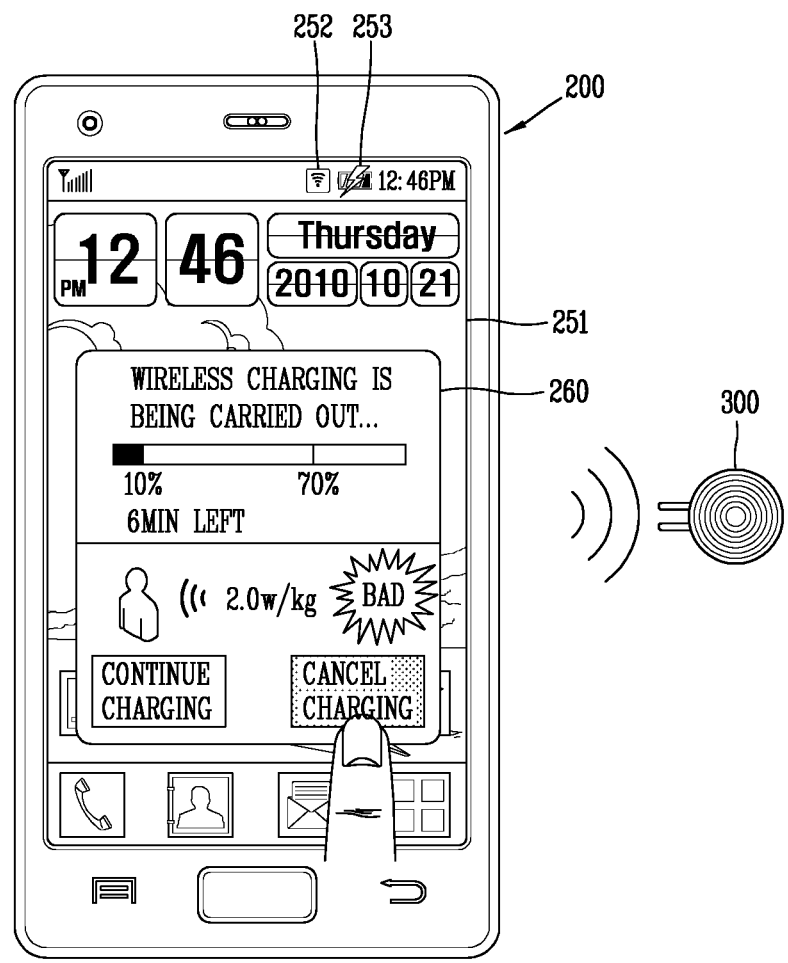
FIGS. 8A through 8B are conceptual views illustrating a fifth operation example of the mobile terminal according to FIG. 3.
Figure 8B:
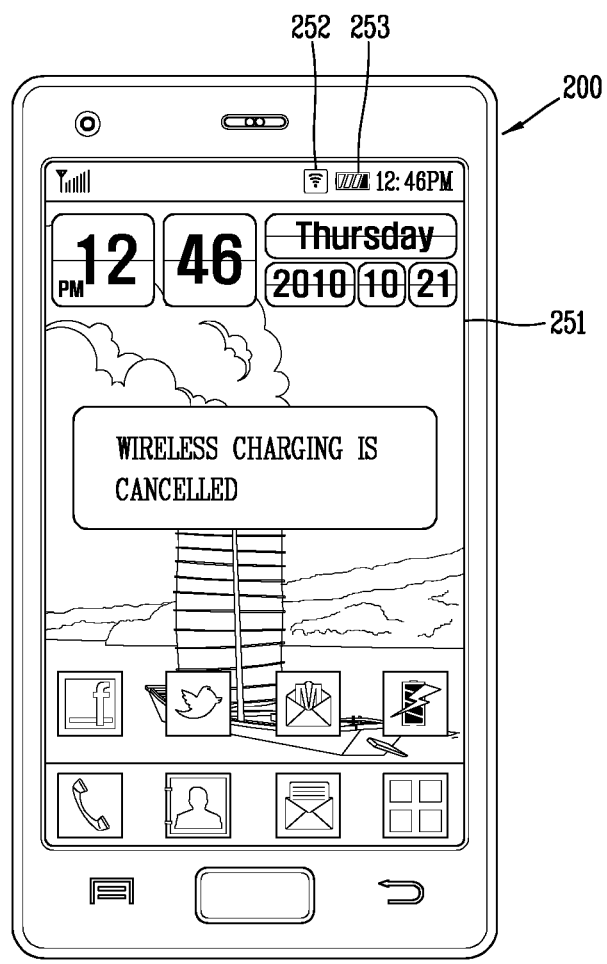

FIGS. 8A through 8B are conceptual views illustrating a fifth operation example of the mobile terminal 200 according to FIG. 3. Specifically, FIGS. 8A and 8B are conceptual views illustrating an example in which the mobile terminal 200 displays electromagnetic wave information generated from the wireless charger 300.

The mobile terminal 200 may include a power receiver 191 (refer to FIG. 1), a display unit 251, and a controller 180 (refer to FIG. 1). The mobile terminal 200 may be disposed adjacent to the wireless charger 300. The mobile terminal 200 may further include a sensing unit 140 (refer to FIG. 1). The sensing unit 140 can measure electromagnetic waves generated from the wireless charger 300. Accordingly, the electromagnetic wave information measured at the sensing unit 140 may be displayed on the display unit 251 of the mobile terminal 200.

On the other hand, the mobile terminal 200 can receive electromagnetic wave information generated from the wireless charger 300 through the wireless communication unit 110 (refer to FIG. 1). Accordingly, the received electromagnetic wave information may be displayed on the display unit 251.

Referring to FIG. 8A, the electromagnetic wave information may be displayed along with power energy information to be received, power energy information that has been received or expected charging time information. The electromagnetic wave information may be displayed as a numerical value or displayed in the form of an icon. Furthermore, when the numerical value of the electromagnetic waves is equal to or greater than a reference numerical value, an icon notifying that it is harmful to the user may be displayed thereon.

Furthermore, as illustrated in the drawing, when the numerical value of the electromagnetic waves is equal to or greater than a reference numerical value, a menu (hereinafter, referred to as a "charging cancel menu") corresponding to a charging cancel function may be displayed thereon. At this time, when the charging cancel function menu is selected, referring to FIG. 8B, wireless charging may be cancelled, and a message indicating that wireless charging is cancelled may be displayed on the display unit 251.

Though electromagnetic wave information is displayed on the display unit 251 while receiving power in a wireless manner from the wireless charger 300 in the drawing, a time point at which the electromagnetic wave information is displayed on the display unit 251 is not limited to this. In other words, the electromagnetic wave information may be displayed on the display unit 251 prior to receiving power in a wireless manner or may be displayed on the display unit 251 subsequent to receiving power.

Furthermore, the electromagnetic wave information may be displayed on the display unit 251 all the time while sensing the wireless charger 300 located adjacent to the mobile terminal 200. At this time, the electromagnetic wave information may be displayed at a portion of the home screen.

Figure 9A:
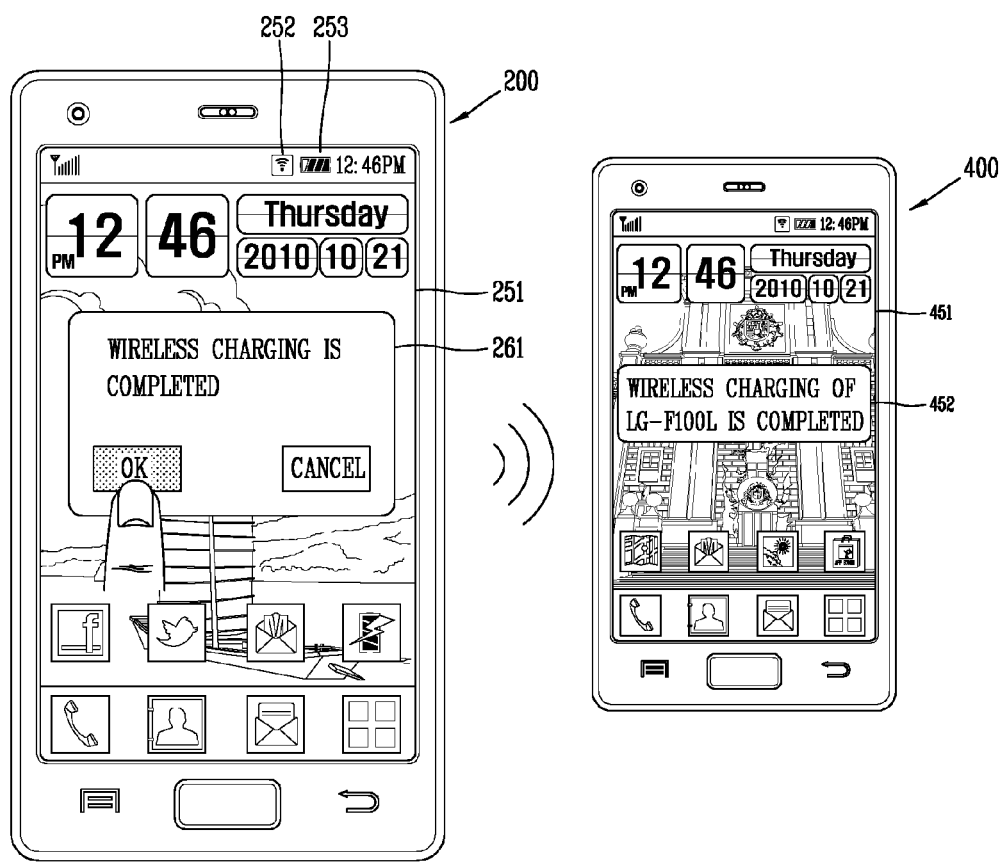
FIGS. 9A through 9C are conceptual views illustrating a sixth operation example of the mobile terminal according to FIG. 3.
Figure 9B:
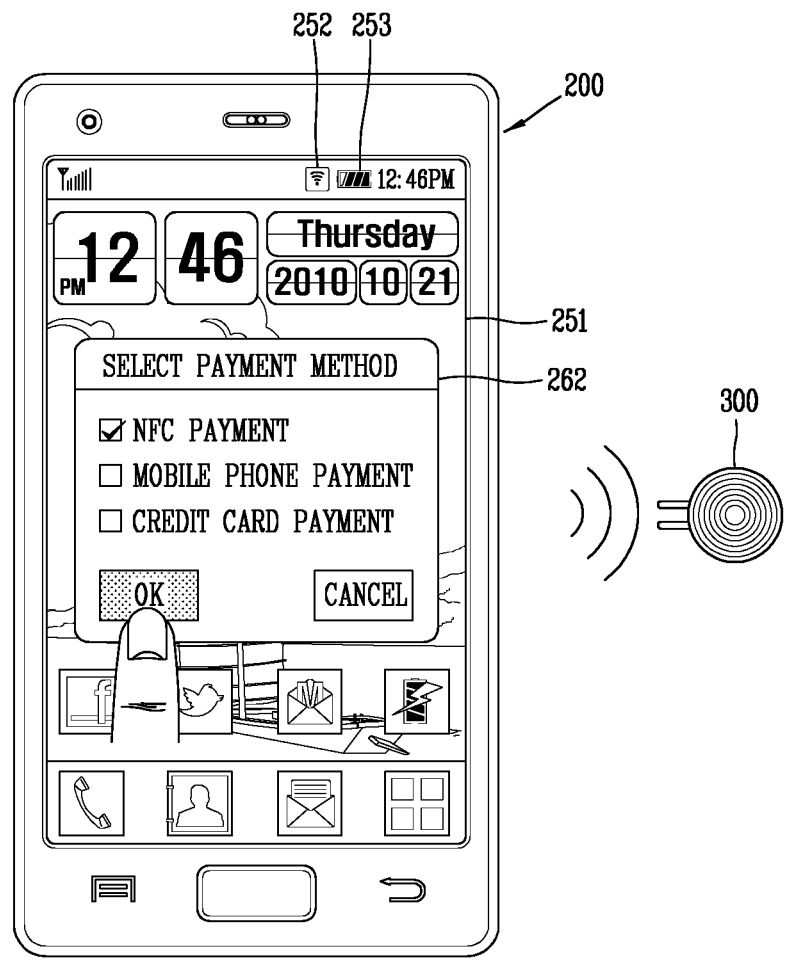
Figure 9C:
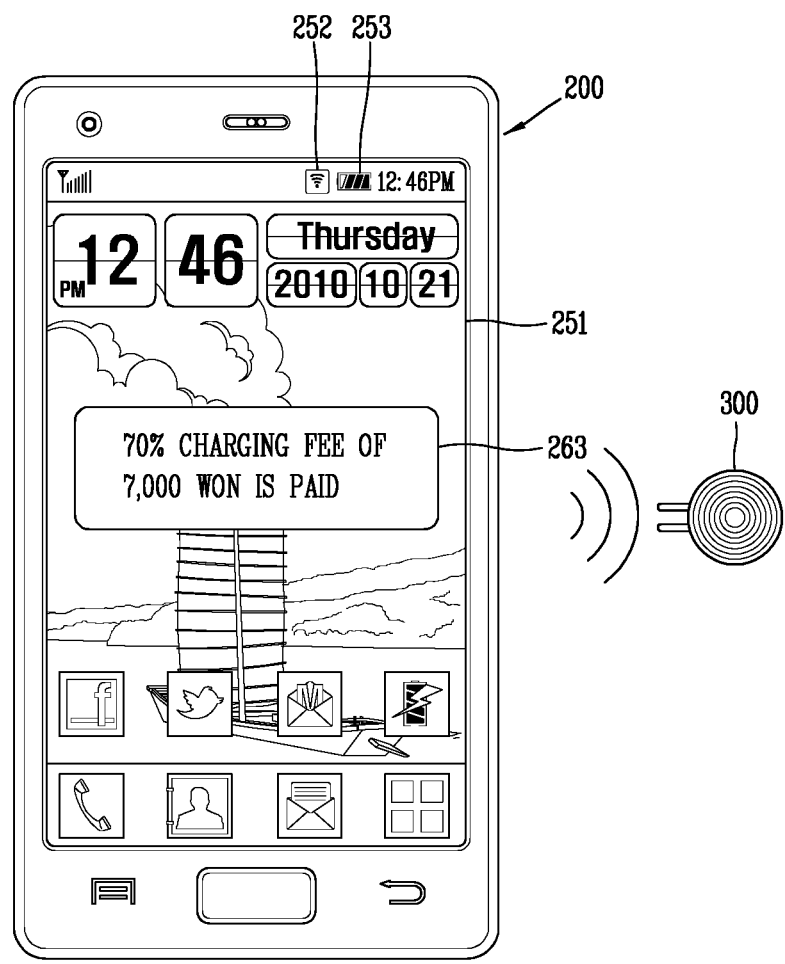

FIGS. 9A through 9C are conceptual views illustrating a sixth operation example of the mobile terminal 200 according to FIG. 3. Specifically, FIGS. 9A through 9C are conceptual views illustrating an example in which the mobile terminal 200 receives the determined amount of power, and then outputs a notification signal. The mobile terminal 200 may include a power receiver 191 (refer to FIG. 1), a display unit 251, and a controller 180 (refer to FIG. 1). The mobile terminal 200 may be disposed adjacent to the wireless charger 300. The mobile terminal 200 may be disposed to perform wireless charging with an external device 400.

Referring to FIG. 9A, when the power receiver 191 receives power in a wireless manner as much as the determined amount of power from the wireless charger 300, the controller 180 outputs a notification signal. The controller 180 displays a text message 261 or graphic message on the display unit 251 or output a sound effect or vibration signal as a notification signal. A menu (hereinafter, referred to as a "payment menu") corresponding to a payment function may be displayed for the text message 261.

Furthermore, as illustrated in the drawing, the controller 180 may transmit a message notifying that wireless charging has been completed to the external device 400 performing wireless communication. At this time, the external device 400 may be any device capable of performing at least one of wired communication or wireless communication. For example, the external device 400 may be a notebook computer, a tablet PC, a TV, another mobile terminal, or the like. The external device 400 displays a text message 452 or graphic message on the display unit 451 or output a sound effect or vibration signal as a notification signal.

Then, when a payment menu displayed on the text message 261 is selected, referring to FIG. 9B, the controller 180 of the mobile terminal 200 displays a message 262 capable of selecting a payment method on the display unit 251. At this time, when an "NFC payment" menu is selected as the payment method, referring to FIG. 9C, the controller 180 can perform a settlement process through near field wireless communication with a tag for communication mounted on the wireless charger 300.

Specifically, a tag for communication is mounted on the wireless charger 300. The mobile terminal 200 receives tag information from the tag for communication mounted on the wireless charger 300. To this end, the short-range communication unit 114 (refer to FIG. 1) of the mobile terminal 200 may be configured to perform short-range wireless communication, for example, near field communication.

The tag for communication may be mounted at an outer portion or inner portion of the wireless charger 300. The tag for communication is a medium for storing tag information corresponding to this. Such a tag for communication may include billing information based on wireless charging. The tag for communication may provide billing information based on wireless charging to the mobile terminal 200 through near field communication. Accordingly, the mobile terminal 200 may perform settlement based on the billing information. At this time, a message 263 notifying that settlement is performed based on the billing information on the display unit 251.

Though a case of receiving billing information from the wireless charger 300 is illustrated in the drawing, the controller 180 of the mobile terminal 200 may generate billing information based on wireless charging. In other words, the controller 180 can measure an amount of power received in a wireless manner, and generate billing information based on the measured amount of power.

Furthermore, though the settlement process is performed using near field communication in the drawing, the settlement method is not limited to this. In other words, the controller 180 can transmit power energy information or user information to a server, and the server may request payment to the user.

Figure 10A:
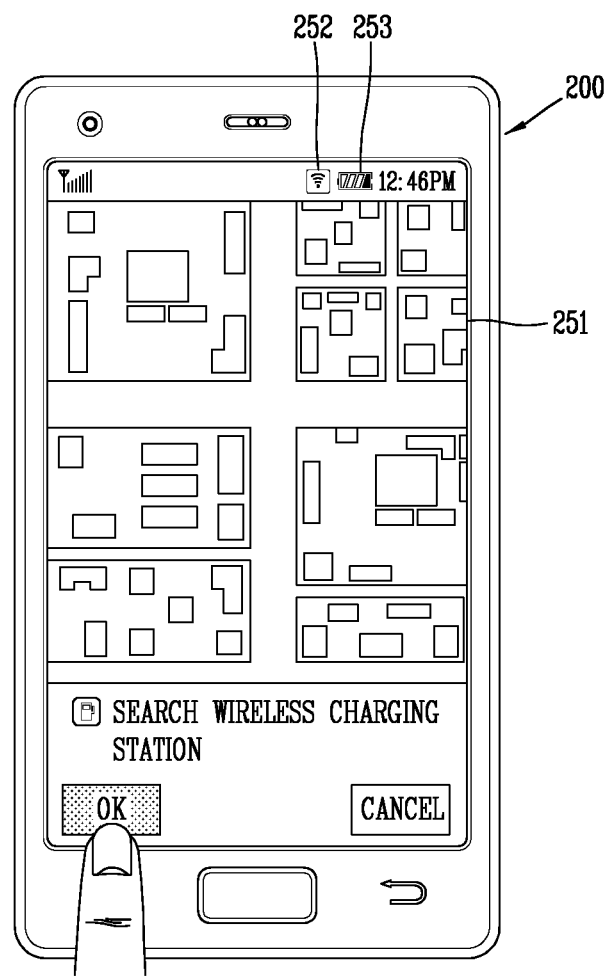
FIGS. 10A through 10C are conceptual views illustrating a seventh operation example of the mobile terminal according to FIG. 3.
Figure 10B:
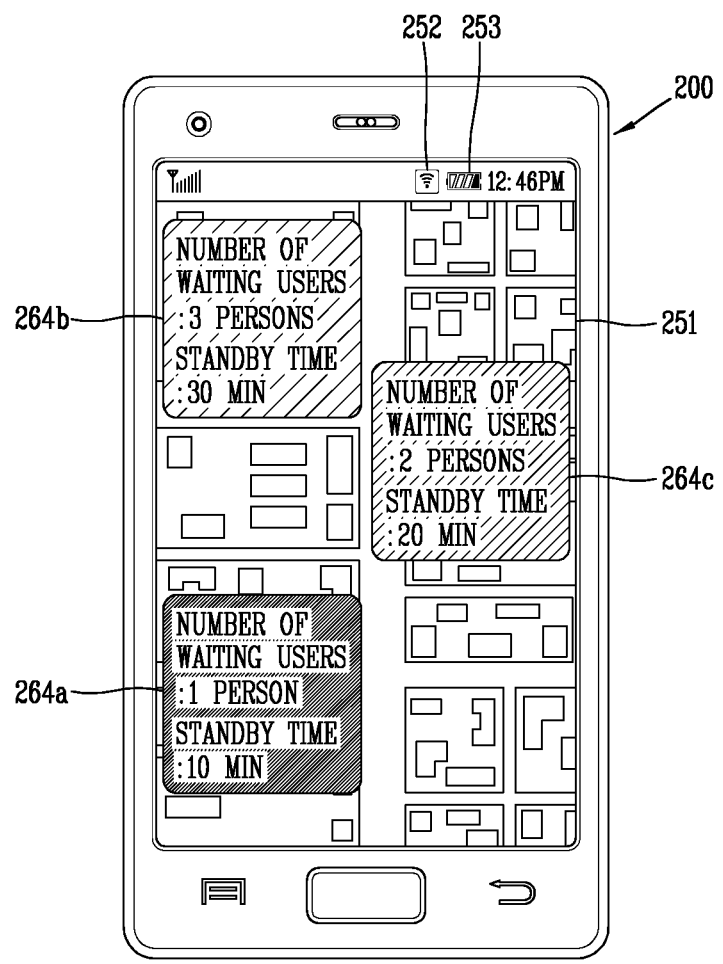
Figure 10C:
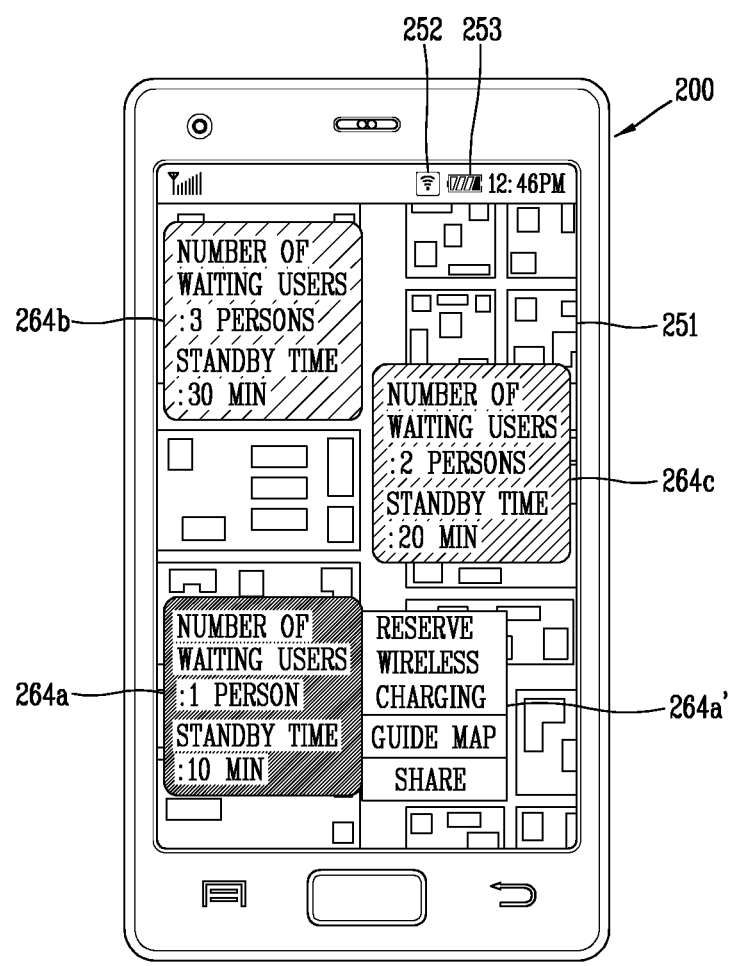

Next, FIGS. 10A through 10C are conceptual views illustrating a seventh operation example of the mobile terminal 200 according to FIG. 3. Specifically, FIGS. 10A through 10C are conceptual views illustrating an example in which the mobile terminal 200 displays a map containing information for wireless charging stations, respectively. The mobile terminal 200 may include a power receiver 191 (refer to FIG. 1), a display unit 251, and a controller 180 (refer to FIG. 1).

Referring to FIG. 10A, the controller 180 displays a map on the display unit 251. At this time, when a touch input to an icon corresponding to a function of searching wireless charging stations is sensed, referring to 10B, the controller 180 displays icons 264a-264c for the wireless charging stations, respectively, on the display unit 251.

The controller 180 can determine the size, shape or color of icons 264a-264c corresponding to the wireless charging stations based on at least one of a number of users to wait for receiving power in a wireless manner from the wireless charging station, a standby time for receiving power in a wireless manner from the wireless charging station, and the electromagnetic wave information of the wireless charging station.

For example, as illustrated in the drawing, an icon 264a corresponding to a wireless charging station with the smallest number of waiting users and the shortest waiting time may be displayed with the darkest color, and an icon 264c corresponding to a wireless charging station with the largest number of waiting users and the longest waiting time may be displayed with the lightest color.

Referring to FIG. 10C, when a touch input to at least one of the icons 264a-264c is sensed, the controller 180 displays information 264a' associated with an additional function for the touched icon 264a on the display unit 251. Here, the additional function may include at least one of a wireless charging reservation function, a route guidance function for guiding the wireless charging station, and a share function using a social network service or the like.

Though a text message associated with the wireless charging station, for example, the number of waiting users information and standby time information, is displayed on icons 264-264c corresponding to the wireless charging stations, respectively, in the drawing, it is not necessarily be limited to this. In other words, when a touch input to at least one of the icons 264a-264c is sensed in a state that a text message is not displayed on the icons 264a-264c, the controller 180 displays information associated with the wireless charging station for the touched icon on the display unit 251.

Figure 11A:
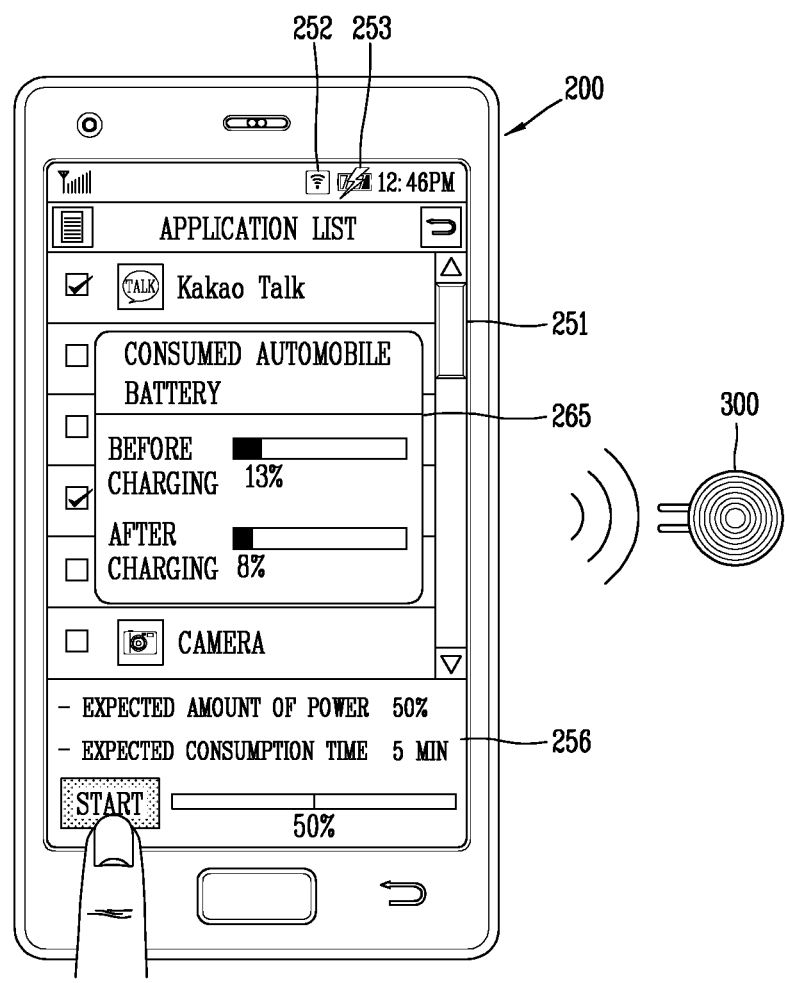
FIGS. 11A through 11C are conceptual views illustrating an eighth operation example of the mobile terminal according to FIG. 3.
Figure 11B:
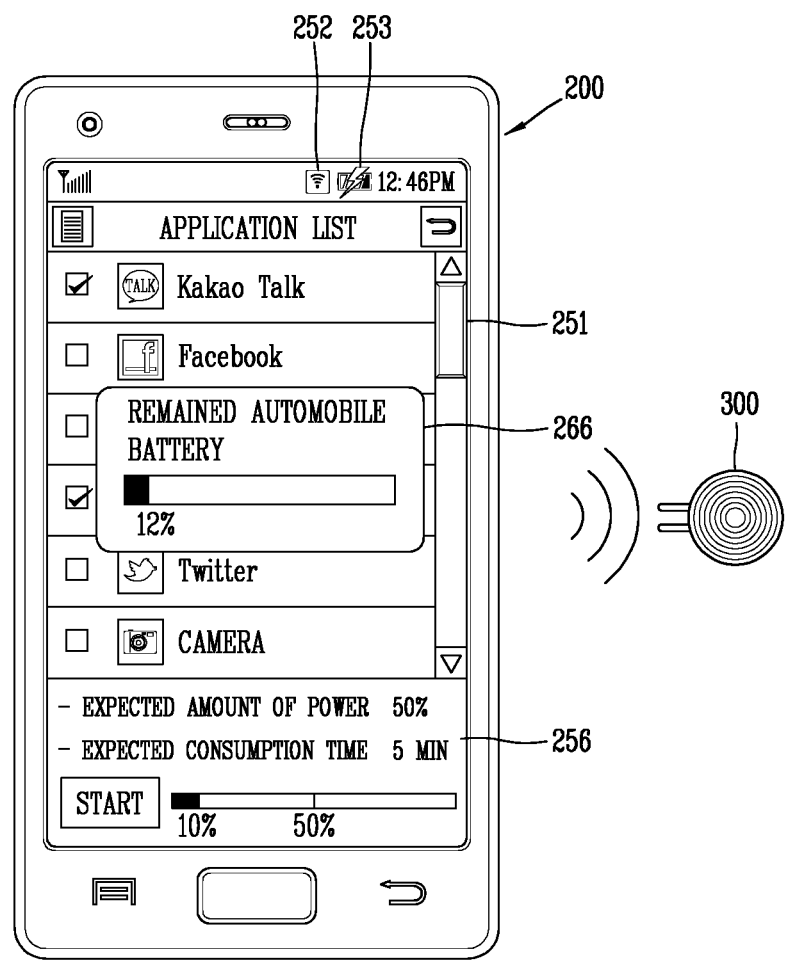
Figure 11C:
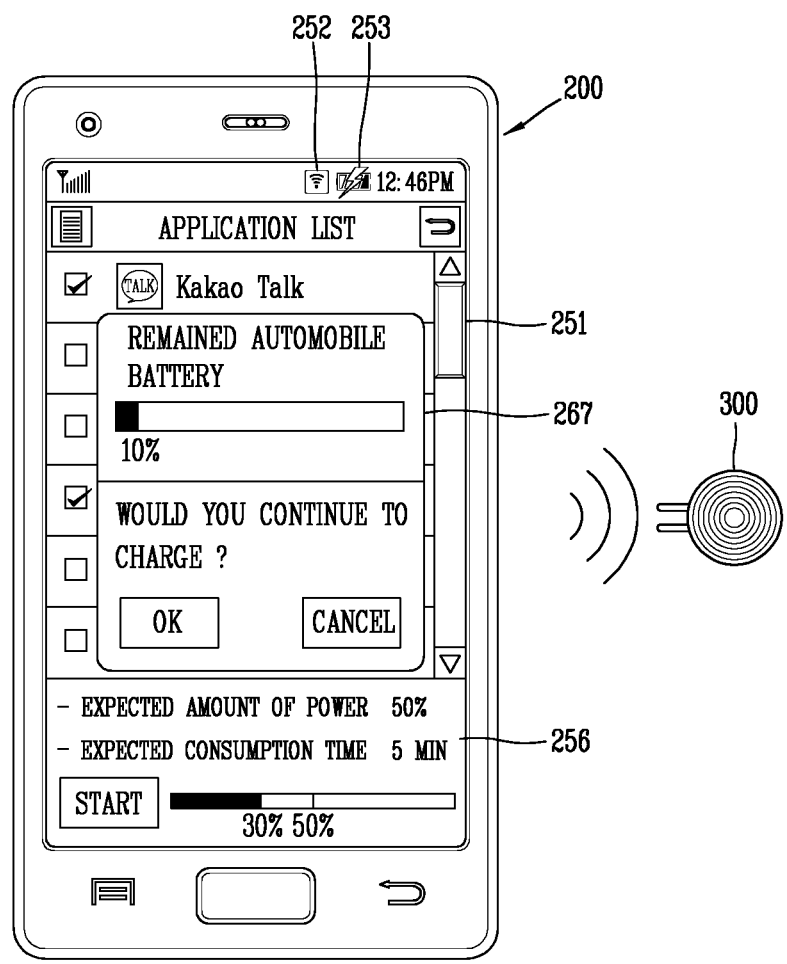

Next, FIGS. 11A through 11C are conceptual views illustrating an eighth operation example of the mobile terminal 200 according to FIG. 3. Specifically, FIGS. 11A through 11C are conceptual views illustrating an example in which the mobile terminal 200 receives an amount of power as much as the determined amount of power, and then outputs a notification signal.

The mobile terminal 200 may include a power receiver 191 (refer to FIG. 1), a display unit 251, and a controller 180 (refer to FIG. 1). The mobile terminal 200 may be disposed adjacent to the wireless charger 300.

Referring to FIG. 11A, the controller 180 displays a list of applications as information associated with the selection of an amount of power. When at least one of applications contained in the list is selected, the controller 180 displays a message 256 containing at least one of power energy information and expected charging time information, which are required to execute the selected application on the display unit 251.

At this time, as illustrated in the drawing, the power energy information required to execute the selected application may be displayed on the display unit 251 in the form of a progress bar. The controller 180 may determine an amount of power to be received based on the amount of power required to execute the selected applications.

At this time, when power is received in a wireless manner from a battery of the external device (for example, automobile) through the wireless charger 300, the controller 180 may receive at least one of automobile battery information prior to wireless charging and expected automobile battery information subsequent to wireless charging from the wireless charger 300, and display a message 265 containing the received information on the display unit 251.

Then, referring to FIG. 11B, the controller 180 may receive the battery remaining amount information of the automobile while receiving power in a wireless manner from the wireless charger 300, and display a message 266 containing the received information on the display unit 251.

At this time, referring to FIG. 11C, the controller 180 may determine whether the battery remaining amount information of the automobile corresponds to a preset amount using the battery remaining amount information, and display a message 267 for selecting whether to continue to receive power in a wireless manner from the wireless charger 300 on the display unit 251 when the battery remaining amount information of the automobile corresponds to the preset amount.

When the battery remaining amount information of the automobile corresponds to the preset amount, the controller 180 outputs a notification signal. The controller 180 displays a text message or graphic message on the display unit 251 or output a sound effect or vibration signal as the notification signal.

Furthermore, the controller 180 of the mobile terminal 200 controls a function of the automobile through short-range wireless communication with the wireless charger 300 or automobile. The controller 180 may transmit multimedia contents to the automobile, and the automobile may reproduce the received multimedia contents. In addition, when a camera is mounted on the automobile, the controller 180 of the mobile terminal 200 may receive an image acquired from the camera mounted on the automobile, and perform an augmented reality function, a search function, a navigation function, and the like.

Furthermore, according to an embodiment of present invention, the foregoing method may be implemented as codes readable by a processor on a medium written by a program. Examples of the processor-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to the foregoing mobile terminal, and all or part of each embodiment may be selectively combined and configured to make various modifications thereto.

What is claimed is:

1. A mobile terminal, comprising:
    a wireless communication unit configured to receive charging standby information from a plurality of wireless chargers, respectively;
    a display unit configured to display a message including a full charge menu and a partial charge menu as information associated with a selection of an amount of power when one of the plurality of wireless chargers is sensed;
    a power receiver configured to wirelessly receive power from a wireless charger; and
    a controller configured to:
    display, on the display unit, a list of applications for receiving an input to select at least one application from the list of applications when the partial charge menu is selected,
    determine an amount of power needed to execute the at least one application selected from the list of applications,
    control the power receiver to receive only the amount of power needed to execute the selected at least one application, and
    transmit a message notifying that wireless charging has been completed to the wireless charger, when the amount of power needed to execute the selected at least one application is received.

2. The mobile terminal of claim 1, wherein the controller is configured to distinctively display a display object corresponding to the selected wireless charger to distinguish the display object from other objects corresponding to non-selected wireless chargers,
    wherein when the wireless charger is selected, the display unit is further configured to display a menu including at least one of an immediate charging menu option and a reserved charging menu option, and
    wherein the controller is further configured to immediately wirelessly receive power from the selected wireless charger when the immediate charging menu option is selected, and to wirelessly receive power from the selected wireless charger after a predetermined period of time has passed when the reserved charging menu option is selected.

3. The mobile terminal of claim 2, wherein the charging standby information comprises at least one of a number of users waiting to wirelessly receive power from the wireless chargers and a standby time for wirelessly receiving power from the wireless chargers.

4. The mobile terminal of claim 3, wherein the controller is further configured to set a size, shape or color of the display objects corresponding to the plurality of wireless chargers, respectively, based on at least one of the number of users waiting to wirelessly receive power from the wireless chargers and the standby time for wirelessly receiving power from the wireless chargers.

5. The mobile terminal of claim 1, wherein the display unit is further configured to display power energy information associated with an amount of power energy to be received from the selected wireless charger.

6. The mobile terminal of claim 1, wherein the controller is further configured to automatically select applications in the list of applications based on at least one of time information, location information and weather information, determine the amount of power needed to execute the automatically selected applications, and wirelessly receive the determined amount of power from the selected wireless charger.

7. The mobile terminal of claim 6, wherein the controller is further configured to automatically display icons corresponding to the selected applications on a home screen of the mobile terminal.

8. The mobile terminal of claim 1, wherein the controller is further configured to display a payment option menu to pay for the wireless charging, and perform a settlement process with an external entity based on inputs to the payment option menu.

9. The mobile terminal of claim 1, further comprising:
a sensing unit configured to measure electromagnetic waves between the mobile terminal and the selected wireless charger, and to display progress information indicating a progress of wireless charging the mobile terminal from the selected wireless charger.

10. The mobile terminal of claim 1, wherein the controller is further configured to display a map including locations of the plurality of wireless chargers.

11. The mobile terminal of claim 1, wherein when the selected wireless charger is receiving power from an external device having a battery, the controller is further configured to display battery remaining amount information of the external device on the display unit.

12. The mobile terminal of claim 11, wherein the controller is further configured to display information indicating a battery remaining amount of the battery of the external device and an option for cancelling receiving power or continuing receiving power from the battery of the external device.

13. A method of controlling a mobile terminal, the method comprising:

receiving, via a wireless communication unit, charging standby information for a plurality of wireless chargers, respectively;

displaying a message including a full charge menu and a partial charge menu as information associated with a selection of an amount of power when one of the plurality of wireless chargers is sensed;

wirelessly receiving, via a power receiver, power from a wireless charger selected based on the charging standby information among the plurality of wireless chargers for a wireless charging;

displaying a list of applications for receiving an input to select at least one application from the list of applicatons when the partial charge menu is selected;

determining an amount of power needed to execute the at least one application selected from the list of applications;

controlling the power receiver to receive only the amount of power needed to execute the selected at least one application; and transmitting a message notifying that wireless charging has been completed to the wireless charger, when the amount of power needed to execute the selected at least one application is received.

14. The method of claim 13, further comprising:
distinctively displaying, via the display unit, a display object corresponding to the selected wireless charger to distinguish the display object from other objects corresponding to non-selected wireless chargers.

15. The method of claim 14, wherein when the wireless charger is selected, the method further comprises:
displaying a menu including least one of an immediate charging menu option and a reserved charging menu option;

immediately wirelessly receiving power from the selected wireless charger when the immediate charging menu option is selected; and wirelessly receiving power from the selected wireless charger after a predetermined period of time has passed when the reserved charging menu option is selected.

16. The method of claim 14, wherein the charging standby information comprises at least one of a number of users waiting to wirelessly receive power from the wireless chargers and a standby time for wirelessly receiving power from the wireless chargers.

* * * * *